United States Patent
Smith

(10) Patent No.: US 9,158,575 B2
(45) Date of Patent: Oct. 13, 2015

(54) MULTITHREADED PROCESSOR ARRAY WITH HETEROGENEOUS FUNCTION BLOCKS COMMUNICATING TOKENS VIA SELF-ROUTING SWITCH FABRICS

(76) Inventor: Graeme Roy Smith, Bury (GB)

( * ) Notice: Subject to any disclaimer, the term of this patent is extended or adjusted under 35 U.S.C. 154(b) by 920 days.

(21) Appl. No.: 13/377,428

(22) PCT Filed: Jun. 9, 2010

(86) PCT No.: PCT/GB2010/050966
§ 371 (c)(1),
(2), (4) Date: Dec. 9, 2011

(87) PCT Pub. No.: WO2010/142987
PCT Pub. Date: Dec. 16, 2010

(65) Prior Publication Data
US 2012/0089812 A1  Apr. 12, 2012

(30) Foreign Application Priority Data

Jun. 12, 2009 (GB) .................................... 0910068.6

(51) Int. Cl.
G06F 9/48 (2006.01)
G06F 15/82 (2006.01)

(52) U.S. Cl.
CPC .............. *G06F 9/4843* (2013.01); *G06F 15/82* (2013.01); *G06F 15/825* (2013.01); *G06F 2209/507* (2013.01)

(58) Field of Classification Search
CPC ...... G06F 15/82; G06F 15/825; G06F 9/4843
USPC ........................................................ 712/18
See application file for complete search history.

(56) References Cited

U.S. PATENT DOCUMENTS 5,241,635 A    8/1993   Papadopoulos et al.
5,388,214 A *  2/1995   Leiserson et al. ............... 712/15
(Continued)

FOREIGN PATENT DOCUMENTS

EP    1 152 329 A1    7/2001
WO   WO 93/02414 A2  2/1993
(Continued)

OTHER PUBLICATIONS

Narasimha, The Batcher-Banyan Self-Routing Network, Oct. 1988, IEEE, vol. 36 No. 10, pp. 1175-1178, [retrieved from the internet on Oct. 28, 2014], retrieved from URL <http://ieeexplore.ieee.org/stamp/stamp.jsp?arnumber=7538>.*

(Continued)

*Primary Examiner* — Andrew Caldwell
*Assistant Examiner* — Jyoti Mehta
(74) *Attorney, Agent, or Firm* — Shumaker, Loop & Kendrick, LLP

(57) ABSTRACT

A shared resource multi-thread processor array wherein an array of heterogeneous function blocks are interconnected via a self-routing switch fabric, in which the individual function blocks have an associated switch port address. Each switch output port comprises a FIFO style memory that implements a plurality of separate queues. Thread queue empty flags are grouped using programmable circuit means to form self-synchronised threads. Data from different threads are passed to the various addressable function blocks in a predefined sequence in order to implement the desired function. The separate port queues allows data from different threads to share the same hardware resources and the reconfiguration of switch fabric addresses further enables the formation of different data-paths allowing the array to be configured for use in various applications.

16 Claims, 14 Drawing Sheets

(56) References Cited

U.S. PATENT DOCUMENTS

| | | | |
|---|---|---|---|
| 5,420,853 A | 5/1995 | McRoberts et al. | |
| 5,887,184 A * | 3/1999 | Ramanan et al. | 712/13 |
| 7,237,087 B2 | 6/2007 | Vorbach et al. | |
| 7,996,652 B2 * | 8/2011 | Claydon et al. | 712/18 |
| 2002/0141403 A1 * | 10/2002 | Akahane et al. | 370/389 |
| 2005/0203988 A1 * | 9/2005 | Nollet et al. | 709/201 |
| 2007/0230475 A1 * | 10/2007 | Langner | 370/394 |
| 2009/0013323 A1 | 1/2009 | May et al. | |
| 2009/0307472 A1 * | 12/2009 | Essick, IV et al. | 712/241 |

FOREIGN PATENT DOCUMENTS

| | | |
|---|---|---|
| WO | WO 94/27216 A1 | 11/1994 |
| WO | WO 98/20427 A1 | 5/1998 |
| WO | WO 2006/114642 A1 | 11/2006 |
| WO | WO 2008/145995 A2 | 12/2008 |
| WO | WO 2008/148132 A1 | 12/2008 |

OTHER PUBLICATIONS

Sato et al., "Thread-based Programming for the EM-4 Hybrid Dataflow Machine", May 19, 1982; 10 pages.
Li et al., "DynaNP—A Coarse-grain Dataflow Network Processor Architecture with Dynamic Configurable Processing Path", Jul. 1, 2007; 6 pages.
Khawam et al., "The Reconfigurable Instruction Cell Array", Jan. 2008; 11 pages.
Borut et al., "Beyond Dataflow", Jan. 1, 2000; 13 pages.
International Search Report of PCT/GB2010/050966, Dec. 12, 2009; 6 pages.

* cited by examiner

```
{
.....
.....
.....

IF (A < B)                    ——————————— CT1
  {
    C++;                      ——————————— ST1
    C || D;
  }
ELSE IF (A == B)              ——————————— CT2
  {
    X = (C * D) + E;          ——————————— ST2
    Y = (G * H) – J;          ——————————— ST3
  }
ELSE                          ——————————— CT3
  {
    M = (P –Q) && R;          ——————————— ST4
    N = (S * T) + M;          ——————————— ST5
  }
}
```

FIG. 2

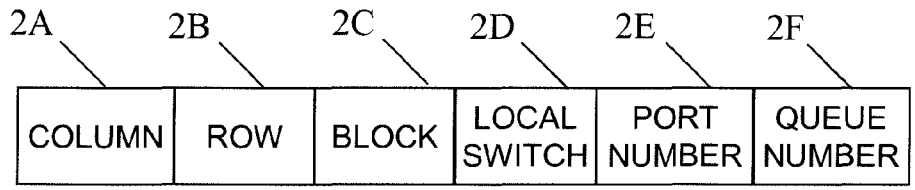
FIG. 4
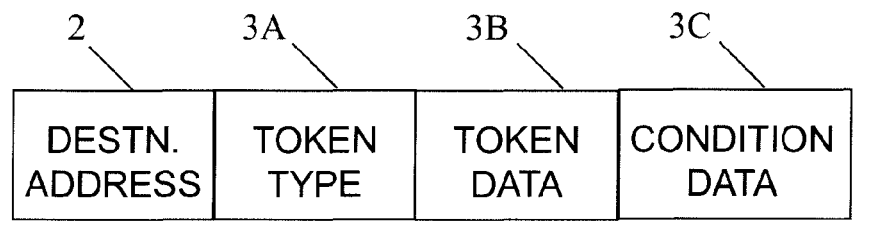
Data – Routing Tag (3D)  Condition Data (3P)
Data – Switch Output (3E)  End of Block (3Q)
Thread Initiator (3F)
Thread Complete (3G)       FIG. 5
Flow Control (3H)
FB Status (3I)
Interrupt (3J)
Global Start (3K), Global Stop (3L)
Group Start (3M), Group Stop (3N)
Block Data Transfer (3O)
Pending Data Block (3P), Data Block Request (3R)
Data Block Grant (3S), Data Block Release (3T)
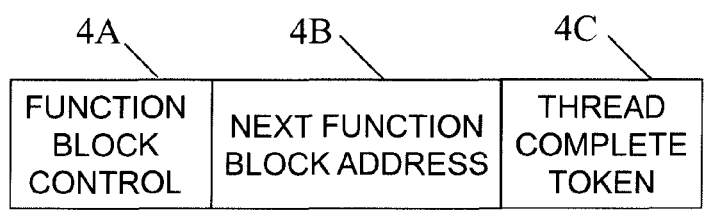
FIG. 6

MULTITHREADED PROCESSOR ARRAY WITH HETEROGENEOUS FUNCTION BLOCKS COMMUNICATING TOKENS VIA SELF-ROUTING SWITCH FABRICS

TECHNICAL FIELD

This invention relates to a hardware array processor comprising a shared resource multi-thread processor array.

BACKGROUND ART

With the every increasing need for denser computing power there is a current trend to implement multi-core arrays. These silicon devices usually have the same microprocessor core instantiated several times on the same device and are interconnected by a shared bus. Due to the sequential architecture of microprocessors they tend only be able to perform a limited number of operations per clock cycle, though peripheral functions offer some parallelism in that are used to calculate the next potential instruction address and implement various interfaces. Different parallel or concurrent threads within a complex application will be assigned to each processor. A thread is a sequence of instructions used to implement a task. A task implements an algorithm and forms part of a computer program. A thread of execution results from a fork of a computer program into two or more concurrently running tasks. When a thread has completed its task, the thread is suspended, destroyed or initiates another thread. Multi-threading describes a program that is designed to have parts of its code or multiple threads execute concurrently. These threads share the processor's resources but are able to execute independently. As a result many of the microprocessor resources may be under utilized, as there is not a one-to-one match between the application algorithms and hardware resources. In addition, many calculations require the transfer and temporary storage of intermediate results, which further consumes processing time and power. Due to their sequential processing, microprocessors and hence related software approaches to parallelism tend to be much slower and inefficient, especially when implementing Digital Signal Processing (DSP) intensive applications.

One solution to this problem is to implement an array processor, in which an array of homogeneous processing elements is provided. The term array processor used herein is not limited to vector processors and includes processors that contain an array of homogeneous or heterogeneous processing elements and can process two or more program threads concurrently. The processing elements in an array processor are usually interconnected in a simple way, for example nearest neighbour, in order to reduce the routing overhead. Several prior art array processors employ a common bus means to transfer data between one or a plurality of elements in an array for processing and reconfiguration. For example, Vorbach, et. al. in U.S. Pat. No. 7,237,087 teaches such an architecture. Nonetheless, such common bus schemes are inefficient and provide data/processing bottlenecks. In addition, such arrays have the disadvantage that each homogeneous processing element needs to be quite complex (implement many type of arithmetic and logic functions) as it may be required to implement one of many functions depending on the algorithm to be implemented. If, for example, the output of one processing element needed to be shifted up or down say, and the next processing element did not implement a shifting function, then an algorithm would be difficult to implement. A shifter may be provided at a certain location in the array, but for data to reach the array it will need to be passed through several pipeline stages. Consequently, all the other stages will either need to be halted or stalled or extra register delays inserted to compensate. In such cases, the sole purpose of a complex array element is to perform a simple pipeline register function. Consequently, the hardware resources are under utilised. It also means that the processing array is synchronous and any delay in one thread will interfere with the processing of other non-related threads. Due to the global synchronous switching of data and array elements the processing of independent threads is limited. This type of processing architecture tends to be very unwieldy to implement and program for.

Another parallel processing solution is a Very Long Instruction Word (VLIW) processor, where sub-fields of an instruction are partitioned to control separate execution units. However, if a VLIW compiler cannot find enough parallel operations to fill all of the slots in an instruction, it must place explicit NOP (no-operation) operations into the corresponding operation slots. This means the hardware is then under utilized. This causes VLIW programs to use more memory than equivalent programs for superscalar processors. Though a VLIW processor provides some parallelism there is no provision for executing independent parallel threads asynchronously.

Many array processors usually have processing elements that implement multiplies and arithmetic logic functions as these operations are commonly found in DSP algorithms. Such arrays lend themselves to implementing digital filters and the like as their data flow graphs map neatly on to the processing array. However, they have limited applications.

Another disadvantage of array processors is that they are based on coarse-grained processing elements and as a consequence it is difficult to implement fine-grained logic functions. Again, this limits the use of these devices.

In some cases, integrated circuits have a mixture of processing cores and hardware resources. This further complicates the issue, especially at design time as many different design tools e.g. separate compilers and simulators for the embedded cores and hardware resources are required to design and test any application.

An alternative to implementing both coarse and fine-grained random logic is to employ Field Programmable Logic Arrays, also referred to as Field Programmable Gate Arrays (FPGAs). FPGA devices use a memory based Look Up Table (LUT) to implement a simple logic function and the more complex versions can include preconfigured DSP slices consisting of many fixed interconnected processing elements. The disadvantage to this approach is that the DSP slices tend to target particular applications and hence FPGA manufacturers need to provide different versions of FPGAs to target these different applications. Though these more complex FPGAs provide a high degree of user programmability they are not fully flexible.

Unfortunately, there are several disadvantages to using FPGAs when compared to alternatives, such as Application Specific Integrated Circuits (ASICs). Firstly, FPGAs tend to be much larger than their hardwired ASIC counterparts, consume more power and are more expensive. Secondly, though they can be re-programmed, a large amount of memory is required to implement specific functions. Another disadvantage of FPGAs is that there is a significant routing overhead required to interconnect all the fine-grained LUTs. The aforementioned devices are usually fabricated using a Complementary Metal Oxide Substrate (CMOS) process.

Once an integrated circuit has been defined and initially tested subsequent actions in the design flow includes automatic test generation and or the insertion of test circuitry, such as Built In Self Test (BIST) and scan chains. However, there is a major design conflict with test circuitry. It is desirable to keep this extra test circuitry to a minimum to reduce silicon overheads and path delays, but it must be flexible enough to provide the desired test/fault coverage. It would be advantageous to be able to reconfigure the available circuit resources so they can be employed as test circuits.

Programmable logic devices allow a circuit designer to use the same device to implement many different logic functions at different times, for example, to include circuit upgrades, try out prototype circuits or correct design errors. This design methodology allows the designer to use off the shelf components rather than designing an Application Specific Integrated Circuit (ASIC), which would be more expensive, take longer to design and to get to market. Another advantage, from a programmable logic manufacturer's perspective, is that one device can be used to address the needs of many different customers and their particular applications. This also allows end product differentiation.

Another way to cater for product differentiation and allow for future upgrades to silicon devices is to provide an area of silicon real estate on a device that is dedicated to implementing programmable or reconfigurable logic. The remainder of the silicon real estate being used to implement dedicated functions. Consequently, such an ASIC device would provide both the benefits of an ASIC device and a programmable logic device.

One reason for using array processor is to provide a high degree of hardware parallelism and allow both dependent and independent threads to be executed concurrently. However, dependent threads (where the execution of one or more threads relies on the results of another thread) need to be synchronised in order to maintain error free processing. Prior art schemes to address this problem, for example US2009013323A1 (May, et. Al.), require elaborate control or Finite State Machines (FSMs), thread control and status registers, inter-thread FSM communication links and associated protocols and instruction sets. Other thread synchronisation methods include using semaphores, mailboxes and mutexes. These approaches tend to be unwieldy (especially for large multi-dimensional arrays as they do not scale well), consume valuable silicon real estate and can hinder thread processing due to delays required to implement thread synchronisation. It is therefore a goal of the present invention to provide a simpler and more efficient thread synchronisation method.

In view of the forgoing, it is a goal of example embodiments of the present invention to provide a programmable shared resource multi-thread processing array in which individual heterogeneous function blocks (both coarse and fine grained) can be interconnected in any combination to implement the desired algorithm. The architecture of example embodiments of the present invention enables the processor array to be reconfigured to implement different processing architectures, such as a Single Instruction Multiple Data (SIMD), Multiple Instruction Multiple Data (MIMD), symmetric multiprocessing and asymmetric multiprocessing. This level of versatility allows the example embodiments of the present invention to target many spheres of use.

Another goal of example embodiments of the present invention is to optimally utilise the available processing array resources by allowing operations from separate and independent threads to share or utilise the processing resources of the same heterogeneous function block as required without reprogramming on the fly.

Yet another goal of example embodiments of the present invention is to allow independent threads to run asynchronously even though the same heterogeneous function blocks are used by different threads, including when interrupts occur in a particular thread and the suspension of one thread using a shared resource does not affect other threads employing the same resource.

Yet another goal of example embodiments is to reduce the number of program memory accesses.

FIG. 1 shows a logical block diagram of the shared resource multi-thread hardware array processor comprising a processor comprising a processor array 100 according to an example embodiment of the present invention. Each block will be introduced initially before being described in more detail later.

One way to overcome the limitations outlined above would be to have an array of heterogeneous function blocks that are interconnected via a plurality of self-routing switch fabrics (SRSF) 700. The heterogeneous function blocks 500 shown further in FIG. 5 are selected from a plurality of specific function blocks, the plurality of function blocks including function blocks and interfaces for fixed point arithmetic operations, floating point arithmetic operations, logical operations, shift operations, memory, input operations, output operations, bit-level manipulations, combinatorial, programmable logic arrays, synchronous and asynchronous logic. A function block 500 therefore implements a discrete program instruction or a plurality of related functions, for example addition and subtraction. However, one or more macro function blocks 500 can be instantiated in the processor array 100 that implement more complex functions, such as cordic, Reduced Instruction Set Computer (RISC) cores, and data block transforms, such as fast Fourier Transforms (FFTs), Inverse Fast Fourier Transforms, Discrete Cosine Transforms (DCTs), Discrete Hilbert Transforms, linear algebra methods, correlation and convolution functions for example. In addition, a macro function block 500 can implement control functions, such as for loops, do-while loops, if-else functions and case statements. This approach allows C-type language constructs to be easily mapped to the resources provided in a processor array 100. As described later a function block 500 can contain a plurality of arithmetic logic elements 560 that can be interconnected via a local switch fabric 550 enabling many operations to be performed in parallel and in a single clock cycle.

A function block requiring N operands, where N is an integer, would connect to N outputs of a particular self-routing switch fabric 700. For example, a multiplier having two operand inputs would have each input connected to an output port of a self-routing switch fabric. The output of a function block is connected to an input of a self-routing switch fabric. Each output port of a preferred self-routing switch fabric is buffered (buffered output port) in order to allow a plurality of inputs to transfer input data tokens (tokens are described in more detail later) to a single output port without causing any delays in the processing of subsequent input data tokens on any of the plurality of input ports. Each self-routing switch fabric is therefore non-blocking. In another embodiment, the self-routing switch fabrics can be blocking. Each output port has a specific address enabling data tokens from different sources to be routed to any chosen output port and hence function block.

The processor array 100 also contains a plurality of thread coordinator units 600 that are used to load program data as well as initiate, maintain and terminate thread execution. In order to implement the various operations or instructions in a given algorithm, resultant data output from one function block is formatted into a token and is then passed to the input of the next function block in algorithm sequence. All token transfers are performed automatically via the self-routing switch fabric and so enables out-of-order or out-of sequence processing to be implemented. As such, the route through concatenated function blocks represents the algorithm to be implemented. As the operation of each function block is implicit by definition, (for example an adder function block performs additions or barrel shifter function block performs shifts on its input data) there is no need to have a centralised instruction control unit issuing commands to the various function block resources. This then reduces the number of program memory and or cache accesses, which can be significant when large program loops are being executed.

Data tokens are passed between each function block based on a unique address attached/appended to the output data of each function block that routes the resultant data token to the next function block. The attached address is also referred to as a routing tag and each function block is an addressable function block. The newly formatted data is referred to as a token and can take different forms as described later. A self-routing switch fabric 700 provides the routing of the data tokens between the function blocks. This allows different threads to operate asynchronously and independently of each other. The term self-routing switch fabric used herein is used to refer to any switch fabric having a plurality of ingress ports and egress ports, wherein input data received at an ingress port can be routed automatically to one or plurality of selected buffered queues based on an address or routing tag appended to the received ingress data. The said self-routing switch fabric being preferably non-blocking. In another embodiment blocking self-routing switch fabrics may be used.

In another embodiment, data transfers between function blocks and switch fabrics and vice versa takes the form of data block transfers or Direct Memory Access (DMA) style transfers. A block of data consists of K concatenated data words, where K is an integer. Such a block than has a single routing tag attached. These block transfers are more efficient than appending a separate routing tag to each data word. In order to facilitate block transfers a switch fabric will route each data word of a block from an ingress port to an egress port on a clock cycle by clock cycle basis and maintain the path between the ingress and egress port until all data from a block has been transferred. The path between the ingress and egress port will be established based on the address fields in the attached routing tag. There are several methods to establish when the last data word of a block has been transferred so the switch fabric can then close the path and establish new ingress to egress paths through the switch fabric. One method is to set the token type field 3A to type block data transfer 3O (which includes the block length) so a switch fabric can count the number of data words transferred. A more efficient method would be to append a condition data field 3C set to end of block 3Q to the end of the block to indicate that the last data word has been processed. Examples of applications where block transfers would be used are DCTs, FFTs, image processing and audio processing where data is processed in blocks. In another embodiment, the routing tag and data word can be transferred in parallel on separate buses. In order to prevent congestion the length of a block can be limited. However, the chosen block length will decide on the application, number of switching resources and simulation results.

Different operands required to perform an operation that arrive at the inputs of a function block from different routes are automatically synchronised before each operand is presented to their respective function block inputs, for example operand A plus operand B when using a two input adder. Thread synchronisation will be explained in more detail later. When the last operation/instruction in a particular thread has been performed, then the associated function block issues a thread complete token, which is routed back to the initiating thread coordinator block. These thread coordinator tokens can be routed back to a thread coordinator unit either via the same self-routing switch fabric used to route the data tokens or a separate self-routing switch fabric dedicated to the purpose.

The output buffer of each self-routing switch port can be configured to implement a plurality of output queues, referred to as thread queues. These queues also have a specific address and are operated on a first-in first-out (FIFO) basis. A queue is associated with a particular thread (referred to as a thread queue or queue for short) and by providing different queues at each output port the same function block can be used by different threads. The scheduling of the output queues is programmable and based on algorithm needs. This can be determined at design time through simulation using Electronic Design Automation (EDA) tool chain 1000, explained below with reference to FIG. 17. The scheduling strategies include, but are not limited to, first come first served, round robin, weighted round robin and priority queues. For example, thread coordinator tokens could be given a higher priority than data tokens has there will be less of them and they are more important in terms of thread control and execution.

Several function block resources can be considered local if they are interconnected using the same basic self-routing switch fabric 700. Such a structure is referred to as a level-1 function block and the self-routing switch fabric interconnecting them a level-1 switch fabric. In another embodiment described later (see FIG. 13), a function block 500 can contain a plurality of arithmetic logic elements 560 interconnected via a local switch fabric 550. A group of level-1 function blocks can be interconnected using another self-routing switch fabric. This switch fabric is referred to as a level-2 switch fabric and the grouped function block a level-2 function block. A plurality of level-2 function blocks can then be tiled and themselves interconnected by separate self-routing switch fabrics. Those familiar with the art will recognise that various switching architectures can be constructed, such as fractal, hypercube, butterfly fat tree or hierarchical switch structures enabling different shared resource multi-thread processor arrays 100 to be implemented.

When implementing different algorithms it becomes apparent that certain operations/instructions occur more frequently than others. For example, most DSP based algorithms rely heavily on multiplies and accumulates or MACs. Function blocks 500 that implement frequently used operations are collectively referred to as frequent functions blocks 107. However, other functions may be required, but do not occur very often or relatively infrequently, such as barrel shifting, truncation, look-up tables, or normalisation. Function blocks 500 that implement infrequently used operations are collectively referred to as infrequent functions blocks 108. Consequently, it would be a very inefficient use of silicon real estate to provide these infrequent functions locally or in every processing element. An alternative would be to implement several of these less used or infrequent operations as function blocks and allow them to be accessed universally from any other function block or thread coordinator unit 101 on a device. This would then lead to a better and more efficient use of available resources by reducing the overall gate count.

Interface blocks 104 are used to transfer data to and from external circuits. Data and control signals 106 are provided to Interface blocks 104 are closely coupled to memory based function blocks 500 and thread coordinators 600. Various types of Interface blocks 104 are provided on the processor array 100 to cater for different interface protocols. Likewise, an Interface block 104 can be constructed from a group of programmable interconnected function blocks enabling the Interface block 104 to be configured to implement one of a plurality of interface protocols.

In an example embodiment, flow control is provided within the self-routing switch fabrics 700 to prevent queue overflow and loss of data. Programmable queue management means are employed so flow control tokens are issued if a particular queue reaches a programmable predefined level. The flow control tokens are routed back to the thread initiator instructing it to "slow down" i.e. reduce the rate at which it issues thread initiator tokens for a determined number of clock cycles. Likewise, the scheduling of tokens from an output queue can be based on the queue level and queue output slots can be stolen from lower priority queues if the need arises. This situation could occur due to uneven or bursty data flows, for example when interrupts occur or data output varies when implementing a compression algorithm.

According to the present invention there is provided a processor array, wherein individual instructions or groups of instructions for one or a plurality of threads are mapped to function blocks of corresponding functionality from an array of addressable heterogeneous function blocks, the same instructions from different threads are optimally mapped to the same function blocks so they share a function block's processing resources, each input port of a N input function block, where N is an integer greater than or equal to 1, is connected directly to a buffered output port of a self-routing switch fabric, each buffered output port being configured to implement one or a plurality of independent thread queues, each thread queue having at least an empty flag output, where one or more groups of Q empty flag outputs, where Q is an integer greater than or equal to 1 and can be a different value for each group, are logically combined by programmable circuit means to form one or more groups of synchronised thread queues, tokens read simultaneously by thread queue scheduler means from the selected group or groups of synchronised thread queues is input directly on selected inputs of an N input function block, resultant data from a function block is formatted into a token by at least having a routing tag appended, the said token being automatically routed via the self-routing switch fabric to a thread coordinator or the next function block in the thread sequence, each thread being initiated, maintained and terminated by a thread coordinator issuing and decoding tokens.

Further features of the invention, its nature and various advantages will become readily apparent from the following detailed description of the invention and the embodiments thereof, from the claims and from the accompanying drawings.

BRIEF DESCRIPTION OF THE DRAWINGS

FIG. 2 shows an example of some pseudo code used to implement several condition threads;

FIG. 4 shows an example of the address format of the route tag used to route tokens through the self-routing switch fabric, for use in example embodiments of the present invention;

FIG. 5 shows an example of the token format for use in example embodiments of the present invention;

FIG. 6 shows an example of the function control & routing memory data format for use in example embodiments of the present invention;

BEST MODES FOR CARRYING OUT THE INVENTION

FIG. 2 shows an example of some pseudo code used to implement several conditional threads. The pseudo code is not associated with any particular algorithm and is shown to help assist in the explanation of the operation of the present invention. It can be seen from FIG. 2 that the if-else loop implements three conditional threads, shown as CT1, CT2 and CT3. The execution of a particular conditional thread is based upon the comparison of the parameters A and B. Within each conditional thread there are several sub-threads labelled ST1 to ST5. Sub-thread ST1 is a sequential thread and hence each subsequent operation is dependent on the result of the previous operation. Sub-threads ST2 and ST3 are initiated if CT2 is true and are independent parallel threads. Sub-thread ST4 and ST5 are initiated if CT3 is true. Though sub-thread ST4 can progress at its own rate, sub-thread ST5 is dependent on the result of ST4 (the parameter M) and so cannot complete until ST4 is complete.

Figure 1:
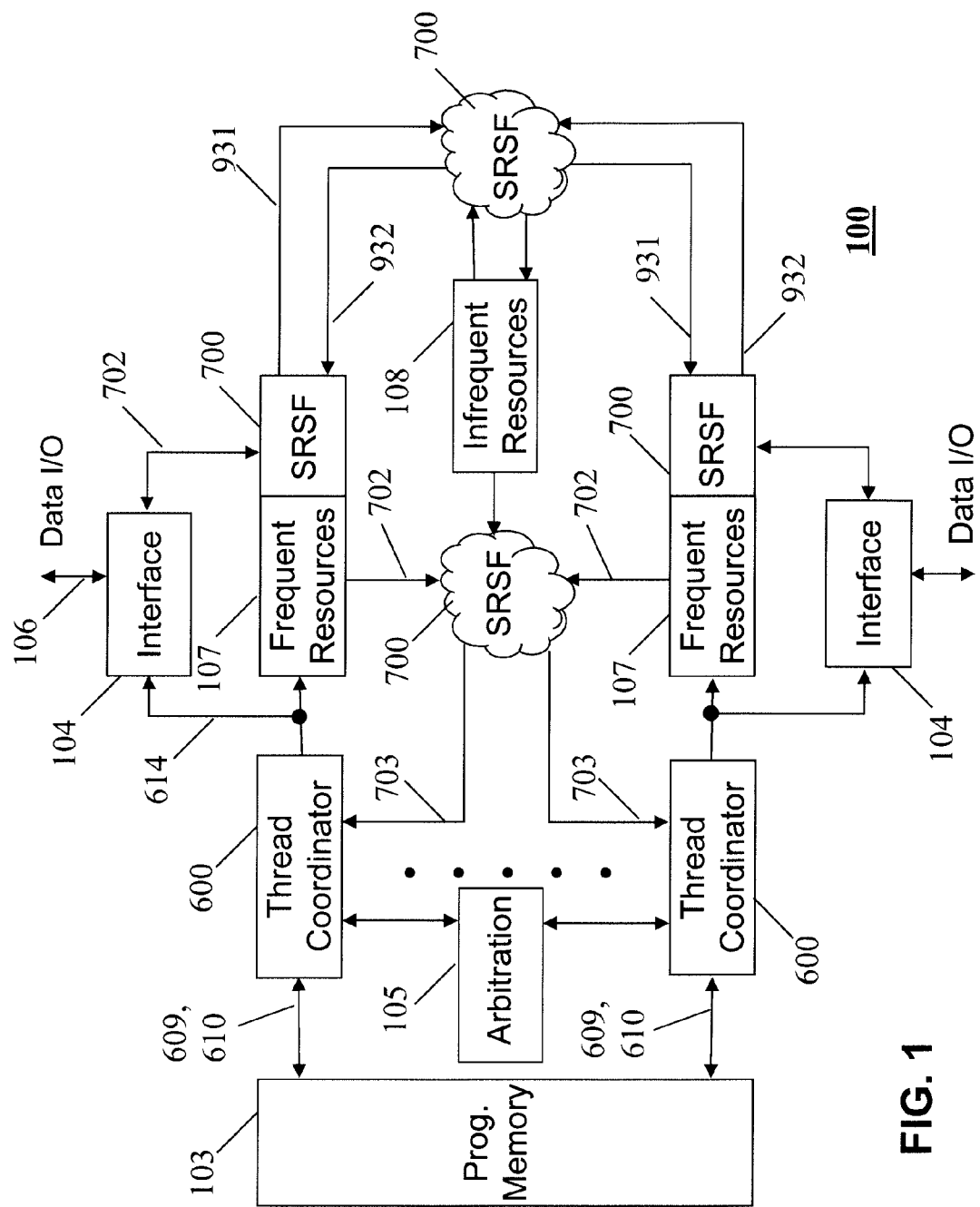
FIG. 1 shows a high-level logic block diagram of a shared resource multi-thread processor array according to an example embodiment of the present invention.
Figure 3:
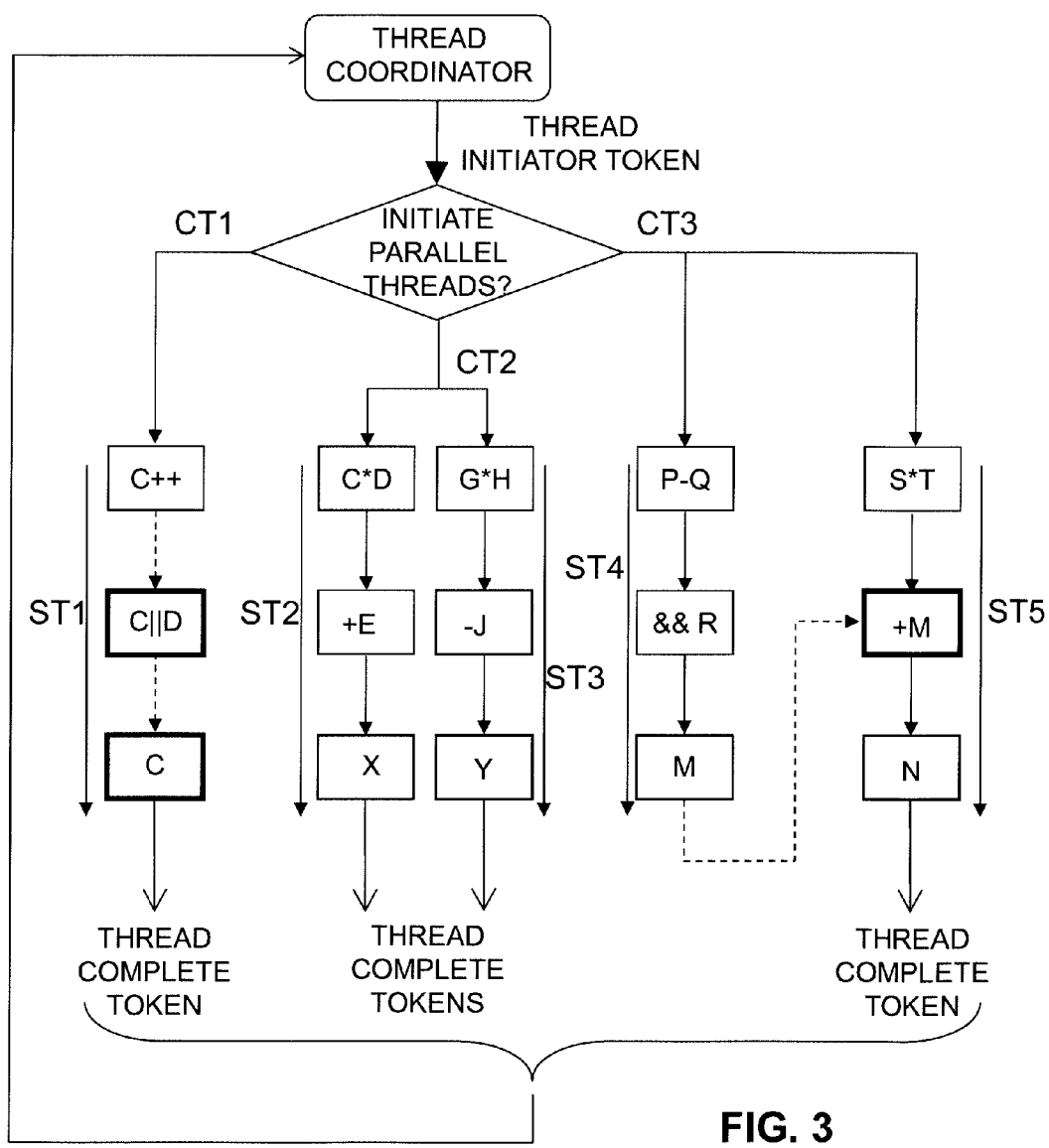
FIG. 3 shows a data flow and thread dependency graph for the pseudo code in FIG. 2.

FIG. 3 shows a data flow and thread dependency graph for the pseudo code in FIG. 2. Dependent operations or instructions are shown in highlighted boxes and are connected by dashed lines. Non-dependent operations are shown in non-highlighted boxes and are connected with solid lines. The point at which a single thread initiates the processing of two or more parallel threads is known as a fork operation. Examples of fork operations are shown a points CT2 and CT3 of the data flow and thread dependency graph of FIG. 3. The process whereby two or more threads merge to initiate a single thread is referred to as a join operation. Examples of join operations (refer to FIG. 3) are when the result of ST4 (the parameter M) is transferred to sub-thread ST5 and when tokens are output from processes X and Y from sub-threads ST2 and ST3 respectively and merged at the thread coordinator. To initiate a thread a function block must first receive a thread initiation token. These are shown as fine dashed lines and labelled CT1 to CT3 in FIG. 3. If a thread requires that a plurality of further threads need to be initiated in parallel, as is the case for CT2 and CT3, then more than one initiator token will be issued. When a plurality of parallel threads needs to be initiated (referred to as a fork), the initiating token needs to be multicast to initiate the separate parallel threads. Each multicast token will have a different address so they can be routed to the appropriate function blocks of each sub-thread. The multicasting of tokens will be explained in more detail later. Once a particular thread has completed execution the final function block in the sequence issues a thread return token, shown as open arrows in FIG. 3. These thread return tokens or thread complete tokens are routed back to the initiating thread coordinator unit.

Figure 16:
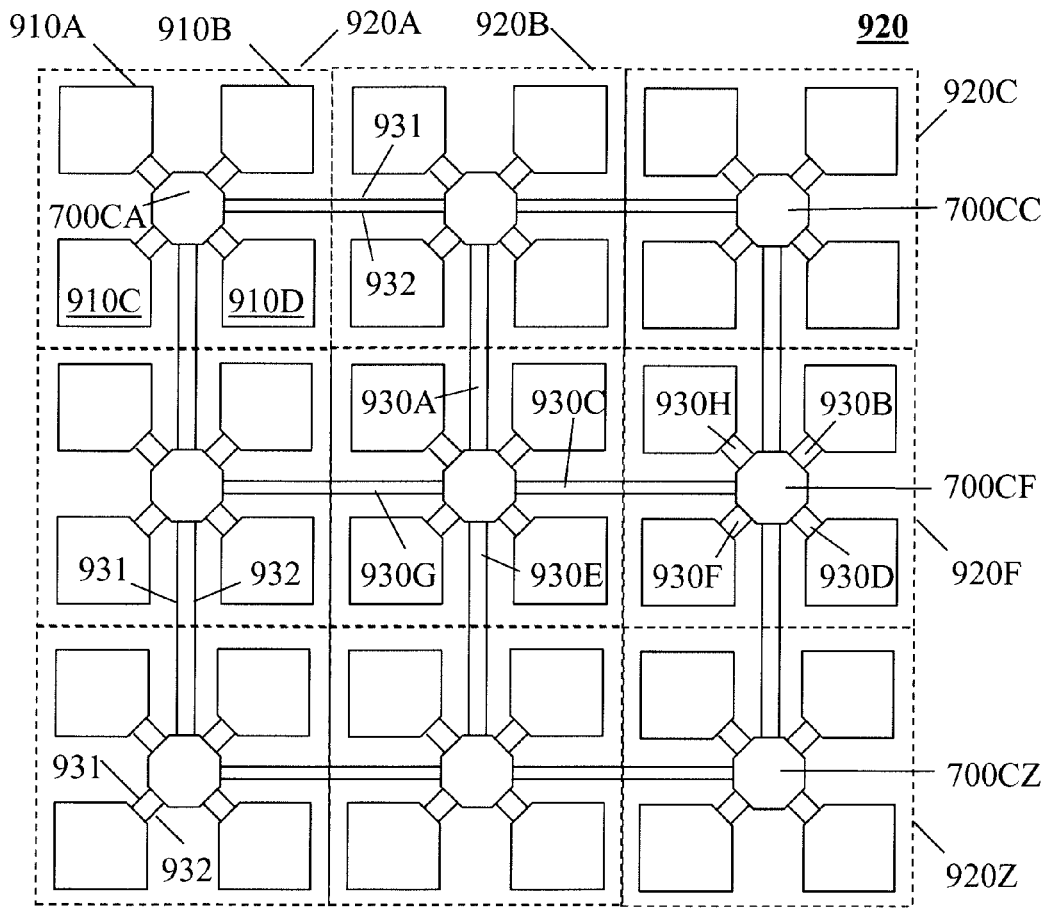
FIG. 16 depicts a tiled array of level-2 function blocks for use in example embodiments of the present invention.

An example of the address field format 2 used by tokens to route data to different output ports and queues via the self-routing switch fabric is shown in FIG. 4. The address field 2 can also be referred to as a routing tag. The address field 2 is divided into six sub-fields 2A to 2F, Sub-field 2A is used to indicate the column address within a processor array. Sub-field 2B is used to indicate the row address within a processor array, Sub-field 2C is used to select a function block and sub-field 2D the local switch within that function block. The output port and queue number within a switch are identified by sub-fields 2E and 2F respectively. This particular address format can be used for 2-dimensional switch fabric, as shown in FIG. 16. For other types of switch fabric, such as a butterfly fat tree switch fabric the sub-fields 2A and 2B are merged to form a single absolute address. Other address formats can be employed depending on the switch fabric architecture used to implement the processor array 100.

Before the thread coordinator unit (FIG. 3) can continue with the next operation it needs to receive and process a thread complete token. If thread CT1->ST1 had been executed, then only one thread complete token will be issued and returned. However, if there are parallel threads, as is the case with threads CT2->(ST2∥ST3), then two thread complete tokens will be issued (one each from processes X and Y). However, the thread coordinator unit will not be aware of this as it will not know in advance which conditional thread has been executed (data dependent). To cater for this scenario one of two embodiments of the invention can be employed. In a first embodiment, each thread complete token will contain a field, which indicates the number of parallel threads that are currently being processed. It then does not matter which thread complete token is received first by the thread coordinator unit as it will know how many thread complete tokens to expect once it receives the first token. It then waits until that many tokens have been returned for that particular thread before executing the next operation. In a second embodiment, which is employed by function blocks 500 and described in more detail later, is to use a plurality of thread queues and group selected thread queue empty flags using programmable circuit means to indicate when a join operation should be initiated and hence synchronised (synchronised thread queues). The waiting and processing of a number of thread complete tokens is referred to as a join or thread merge operation. If after a predefined time-out period not all the thread complete tokens have been received and decoded then the thread coordinator can implement a pre-programmed interrupt service routine to cater for such thread errors.

The fork-join operations outlined above are not limited to a thread coordinator. The join or thread merge operations can also be implemented by a function block 500. This would occur when a function block cannot perform an operation until a specified number of tokens are received in its thread queues. A mechanism to implement this functionality is to use thread queues and group selected thread queue empty flags using programmable circuit means to indicate when a join operation should be initiated and hence synchronised (synchronised thread queues).

FIG. 5 shows an example of the token format. The term token is generic and used to describe one of several types of token. The token format is divided into four sub-fields. The destination address uses the same address format 2 shown in FIG. 4. Sub-field 3A is used to identify the token type, such as a data token, thread complete token, interrupt token, flow-control token or status token. The sub-field 3B contain data relevant to the token type, for example an interrupt vector, or the number of thread complete tokens to expect (as described previously). Sub-field 3C is the condition data field and is used when a thread coordinator unit is executing conditional instruction, such as a do-while (condition) type loop. If the test condition is false, then this field will be set to logic 0 and routed to the thread coordinator unit. The thread coordinator unit will decode the token and as the condition field is false it will proceed to issue another initiator token to go round the loop again. If, however, the tested condition is true, then the condition field 3C will be set to a logic '1'. On receiving and decoding the thread complete token the thread coordinator unit will now terminate the do-while loop and execute the next thread. It will be appreciated that the logic to test the condition will be implemented in a function block 500 that is not part of the thread coordinator 600.

Figure 7:
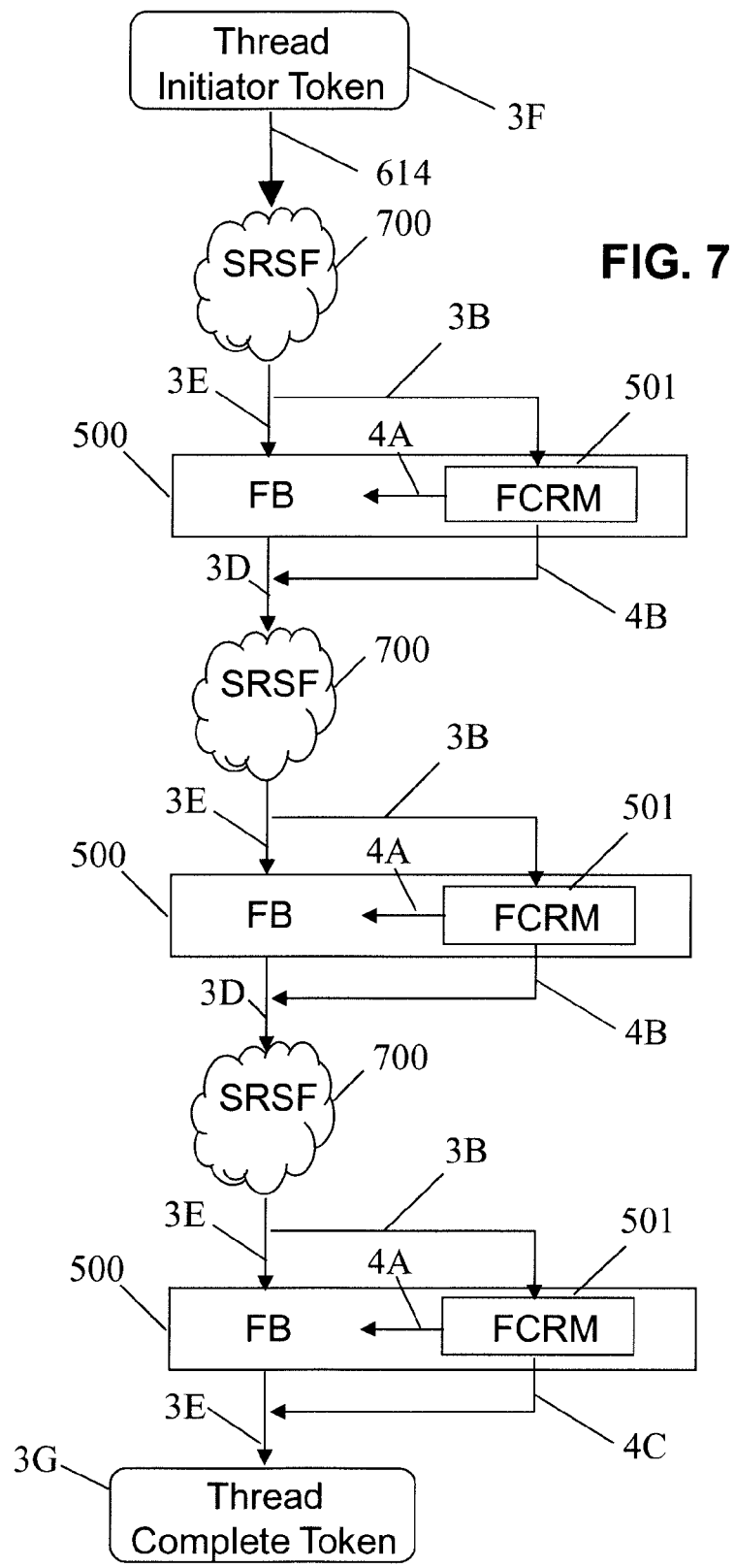
FIG. 7 shows a logical block diagram of how data tokens are routed between function blocks via self-routing switch fabrics in example embodiments of the present invention.
Figure 8:
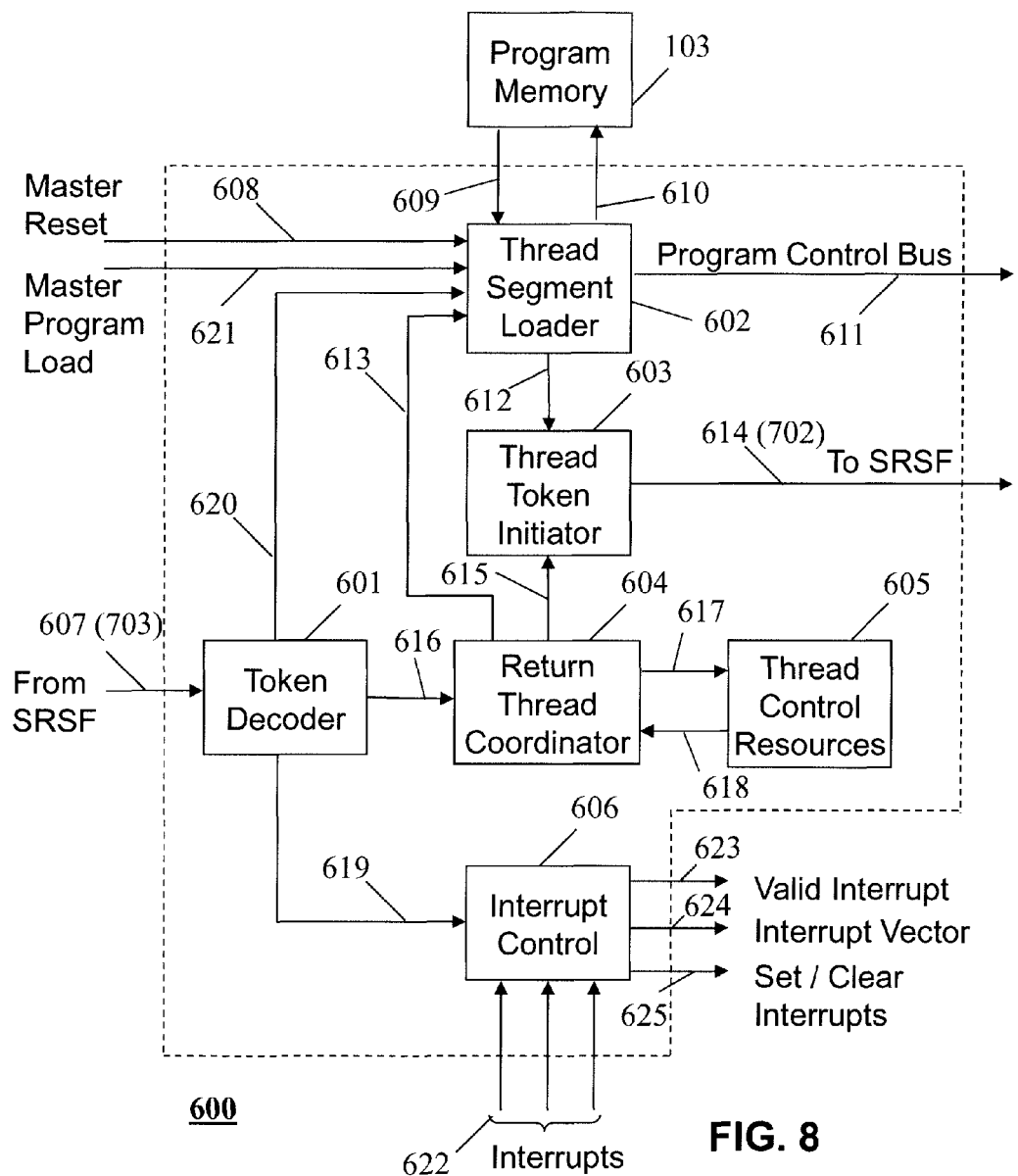
FIG. 8 shows a block diagram of a thread coordinator for use in example embodiments of the present invention.

FIG. 7 is provided to explain how function blocks operate with regards to processing tokens and how data is routed through the array to each addressable heterogeneous function block 500 in turn via self-routing switch fabrics. The last function block 500 in the thread sequence then issues a thread complete token, which is routed to the initiator thread coordinator 600. A thread coordinator 600 issues a token 3 of type initiator 3F. In this example the token is input to a self-routing switch fabric 700 via a bus 614. The token 3 contain an address field 2, which is used to route the token (type data-routing tag 3D) to a particular function block 500. On reaching the destination switch output port the received token type 3D is modified to a token of type 3E by removing the address field, before it is stored in a selected output queue. Token data field 3B is decoded and presented to the function control and routing memory block 501. The data field 3B is effectively an address in this case and used to address function control and routing memory block 501. The output of the function control and routing memory block 501 is a control word 4 used to control the associated function block 500 and provide the address of the next function block 500 the resultant data should be passed to. The format of the function control and routing memory control word 4 is shown in FIG. 6. Field 4A is the function block control field and is used to control logic circuits within a function block and select the function block operation, For example, an adder/subtractor function block may be used to add an offset value stored locally. Therefore, the control field 4A would be used to select the appropriate register and select the add function. Different function blocks would have different control fields 4A depending on the level of functionality provided in the function block. The Next Function Block Address field 4B is appended to the resultant function block output data (to form a token 3 of type data 3D) and is used to route the resultant data to the next function block 500 for further processing. If the function block is the last in the thread sequence then this field is set to a known code e.g. all zeros to indicate the fact. The thread complete token field 4C holds the token 3G (thread complete token)

that are used to indicate that this is the last function block in the thread sequence. This thread complete token is routed to an initiator thread coordinator 600 such as that shown in FIG. 8 via the self-routing switch fabric based on the address field 2. Before the processor array 100 can be used it must first be programmed. This is one of the tasks performed by the thread coordinator 600 shown in FIG. 8. A dedicated compiler, such as an array compiler 1200 shown in FIG. 17, performs the mapping of thread operations or instructions to function blocks. Individual thread operations or instructions are mapped to corresponding function blocks that can implement that particular function. In an embodiment of the invention more complex high level thread functions can be mapped to macro function blocks, for example a Fast Fourier transform. Each thread coordinator 600 shown in FIG. 8 has an input signal 621 that is used to select between master program load mode and thread segment load mode. The processor array may be used in one of several configurations. Each thread coordinator 600 can be connected directly to its own independent program memory 103. Alternatively, a plurality of thread processors can operate as a group and access the same program memory 103. Arbitration means 105 are provided to coordinate program memory accesses by the different thread coordinators 600. In the latter case it would be advantageous for one thread coordinator to be designated the master program load thread coordinator 600. This thread coordinator loads the main program segments at power-on or reset. Once complete, the remaining thread coordinators in the group are initiated. Program data is stored in the non-volatile program memory 103. At power-on or when the master reset 608 is active, the thread coordinator 600 performs the program loading operation. The program data includes specific control instructions that are decoded by the thread segment loader 602. These instructions instruct the thread segment loader 602 how to transfer the program data to the relevant blocks, when all the program data has been loaded and when to begin processing. These instructions include load segment, begin processing, master stop, master start and the like. The first instruction is stored at a convenient predefined address, such as address 0 in the program memory. The thread segment loader 602 accesses the program memory 103 using control signals 610. These signals include the address bus, program memory enable signal and program memory read signal. Program data output from the program memory 103 is presented on the data bus 609 and input to the thread segment loader 602. The program data is transferred to all the required configurable blocks in the processor array 100 via the program control bus 611. All the configurable blocks are addressable and include the queue maintenance & thread synchronisation blocks 750, the function control and routing memory blocks 501 and blocks within a thread coordinator 600. Once all the program data has been loaded the master thread coordinator issues a global start signal or token 3K, which are decoded by all the thread coordinators and program executions begins. The thread segment loader 602 issues a global start command to thread token initiator 603 via connection 612. The thread segment loader 602 then outputs a token 3 (type global start 3K), which is transferred to all other thread coordinators 600. In addition, threads belonging to the same group can be initiated and suspended by receiving and decoding a group start token 3M and group stop token 3N respectively. The global stop token 3L is issued by a thread coordinator 600 operating in master mode when all threads are required to be suspended.

The thread coordinator 600 initiates a thread by issuing a thread initiator token 3F and waiting for the return of one or more thread complete tokens 3G before either performing the next iteration of the same thread or commencing the execution of another thread. Threads can take several forms, for example they could be a set of sequential operations, a set of parallel operations, contain various types of loops and conditional branches. The thread coordinator 600 contains resources to control the execution of threads. The thread control resource block 605 contains programmable counters, registers and comparators that are used to maintain the status of a particular thread. For example, if a FOR LOOP (for x=0; x<31; x++) was being executed then a counter will have been previously loaded (as part of thread segment load operation) or reset to zero and a register set to the value 31. At the start of the loop the thread token initiator 603 would issue a thread initiator token 3F. The thread coordinator 600 would then wait for one or more thread complete tokens 3G to be returned. These tokens would be input to the thread coordinator on bus 607, which is an output 703 from a self-routing switch fabric 700. The received token is decoded by the token decoder 601 to determine its type and how to proceed. As several threads can be in operation at anyone time, for example with nested loops, then the token data field 3B is used to identify a particular thread. This data is used to select the corresponding thread control resources 605 using control signals 617. In this particular example, the corresponding counter is compared to the value in the register and if it less than the stored value of 31 the counter is incremented under the control of the return thread coordinator 604. The result of the comparison is signalled on connection 618. The return thread coordinator 604 then issues a command to the thread token initiator 603 via connection 615 to issue a thread initiator token 3F. This process repeats until the counter has been incremented and equals 32. The return thread coordinator 604 then resets the corresponding thread control resources 605 and issues a command to the thread segment loader 602 via connection 613 to load up the next thread segment from program memory, if necessary. As program data for many threads can be stored in the processor array it is possible for the next thread to be initiated immediately without needing to load up a new segment from program memory 103. The thread segments that are utilised the most will be more likely to remain stored on chip and less likely to be overwritten/replaced by new thread segments (analogous to caching in microprocessors). However, the storing, loading and reloading of different thread segments depends on the application, the number of available resources and the code partitioning. A new thread segment can be loaded while other threads are being executed. Instruction data for the new threads can be loaded into the respective control registers and memories during timeslots (a timeslot being the time required of circuit resources to perform a task) allocated for the previous terminated thread. Another advantage is that the amount of reconfiguration data is small when compared to that required for FPGAs and processor array. The latter being due to the simpler thread synchronisation method employed in the present invention.

A thread coordinator 600 can handle both software and hardware interrupts.

The thread coordinator also caters for a software reset (a form of software interrupt), which will have been issued by another thread coordinator or function block 500. These are decoded by the token decoder 601 and passed to the interrupt control unit 606 via signals 619. The software reset takes the form of a token 3. When decoded by the token decoder 601, the token decoder will issue a command to the thread segment loader 602 (if a particular interrupt thread segment has not already been loaded) via connection 620 to reload a particular segment and a command to the return thread coordinator 604 via connection 616 to suspended operations.

Hardware interrupt signals 622, both external and internal are input to the interrupt control unit 606. Circuit facilities are provided by the interrupt control unit 606 to latch each interrupt event, prioritise any received interrupts and mask selected interrupts. If an interrupt is accepted, then the interrupt control unit 606 issues a true value on the Interrupt Valid signal 623 and place the corresponding interrupt vector or group number on the Interrupt Vector bus 624. The concept of group numbers will be explained in detail later. Once an interrupt routine has been completed the interrupt control unit 606 can clear the interrupt by placing the corresponding interrupt vector or group number on the Interrupt Vector bus 624 and placing a true value on the interrupt clear signal 625. If it is required that previously suspended threads now be flushed as part of the interrupt routine, then the interrupt control unit 606 will place the corresponding interrupt vector or group number on the Interrupt Vector bus 624, place a true value on the interrupt clear signal 625 and place a true value on the Interrupt Valid signal 623. This combination of signals is used to reset the selected queue read and write pointers 803, 804 and thereby flushing any thread.

Figure 9:
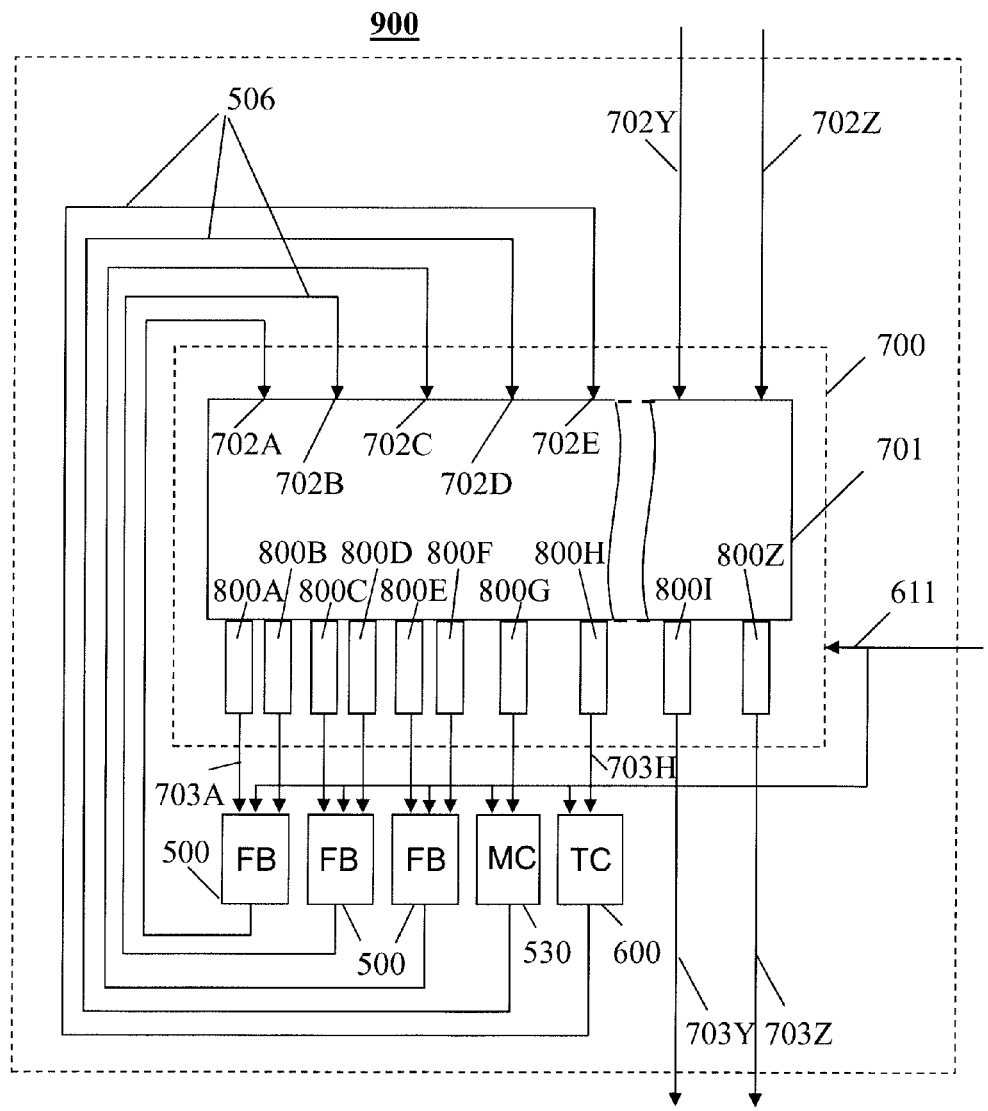
FIG. 9 shows an example level-1 function block for use in example embodiments of the present invention.

A level-1 switch fabric is shown in FIG. 9. It is used to combine a plurality of function block resources 500, illustrated as function blocks 500A to 500Z (individually and collectively referred to as function blocks 500) to the same switch. Such a grouping is referred to as a local resource group. The self-routing switch fabric has a plurality of inputs 702, illustrated as inputs 702A to 702Z (individually and collectively referred to as switch inputs 702) and a plurality of outputs 703, illustrated as switch outputs 703A to 703Z (individually and collectively referred to as switch outputs 703). The number of switch inputs and switch outputs do not necessarily have to be the same value. Data is transferred between the various function blocks 500 via a self-routing switch fabric 700. The output of a function block 500 is routed back to one of the self-routing switch fabric inputs 702. A plurality of switch fabric inputs 702 and switch fabric outputs 703 are used to connect to other switch fabrics 700. Each switch output port 703 is connected to a separate queue memory that is used to implement a multiple queue structure. Data tokens 3 received on any switch input port 702 can be routed to any queue (800A to 800Z) at any switch output port via an array of multiplexers 701. The self-routing switch fabric is preferably non-blocking. Each queue (800A to 800Z) at a switch output port operates on a First-In First-Out (FIFO) basis and preferably operates asynchronously with regards reading and writing data.

Figure 10:
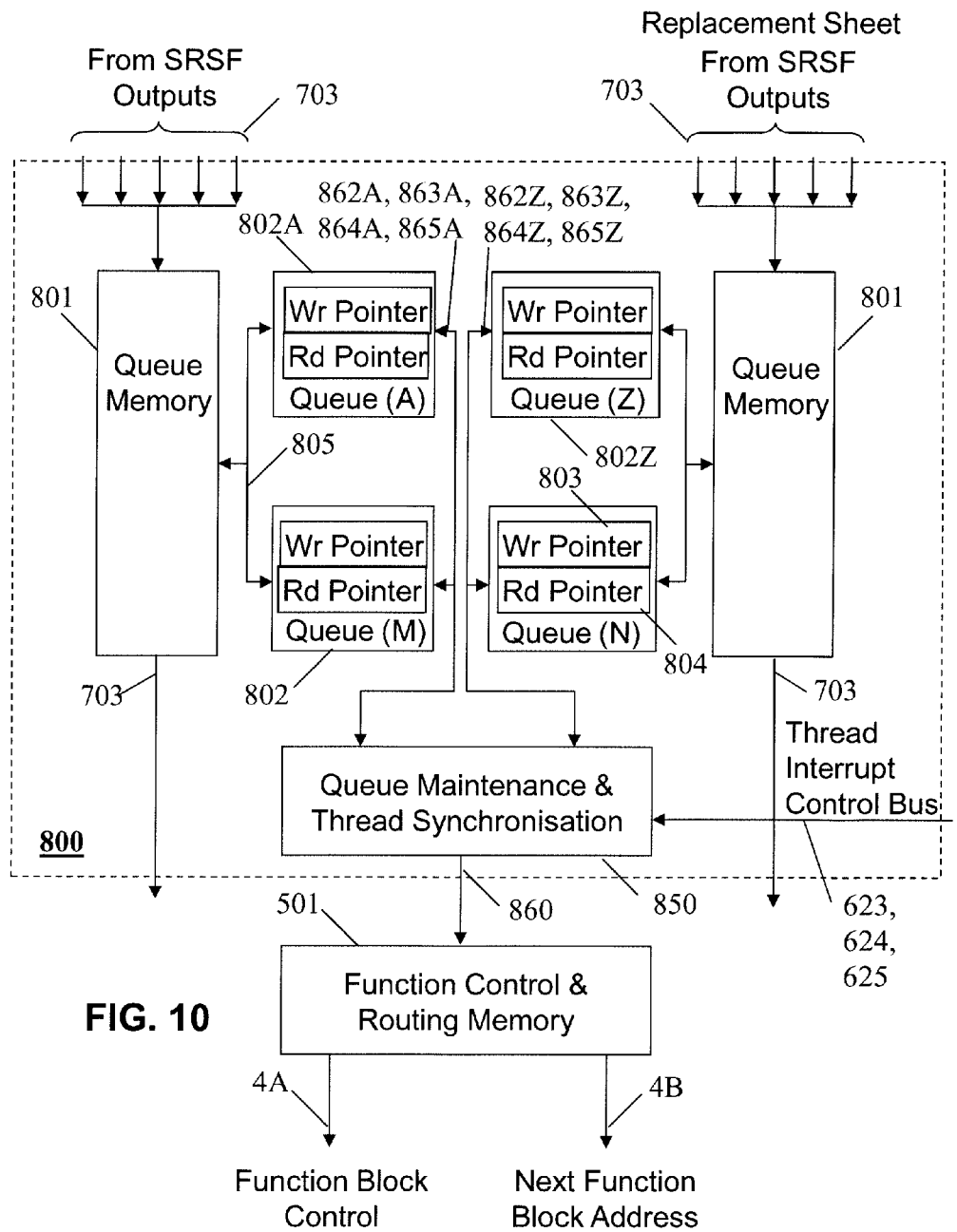
FIG. 10 shows two switch output ports and associated queue control logic for use in example embodiments of the present invention.

Each queue memory 801 shown in FIG. 10 is responsible for storing received data tokens in one of a plurality of queues, synchronising queue threads, scheduling the transfer of data to the connected function block 500 and implementing queue maintenance. Referring to FIG. 10, received data tokens are stored in queue memory 801. The queue memory can be divided into a plurality of separate queues (not shown), each queue being used to store data tokens from a particular thread. The queue structures can be implemented in one of several ways. For example, the queue memory can be divided equally between each queue (predefined allocation of queue memory resources each of which has a dedicated read write pointer pair) or it could be implemented as a linked list. The latter strategy is more complex to implement, but allows the dynamic allocation of memory resources. The former is shown in FIG. 10. Each queue has an associated queue control block 802 (shown as 802A to 802Z, individually and collectively referred to as queue control block 802) that contains a queue write pointer 803 and a read pointer 804. Each queue write pointer 803A to 803Z (individually and collectively referred to as queue write pointer 803) contains the address of the next available memory location in that particular queue to store a received data token 3. Each queue read pointer 804A to 804Z (individually and collectively referred to as queue read pointer 804) contains the address of next available data token to be read from the queue. The control signals and address data from each queue control block 802 is passed to the queue memory via control bus 805. This can be a tristate bus and the signals from individual queue control blocks 802 can be multiplexed. Control circuitry (not shown) within each queue control block 802 is used to handle pointer maintenance e.g. pointer value wrapping when the maximum pointer value overflows, empty flags 862A to 862Z (individually and collectively referred to as empty flags 862), ¾ full flags 863, Full flags 865 and resets 864. Status signals, such as FIFO empty flags 862 and ¾ full flag 863 & Full flags 865, are connected to the queue maintenance & thread synchronisation block 850 where they are used to control the scheduling of output data/tokens from the selected thread queue to the connected function block 500. The queue maintenance & thread synchronisation logic 850 includes logic means to implement a thread queue scheduler 855 that is used to read data from the selected thread queues and load the data into a function block.

Figure 13:
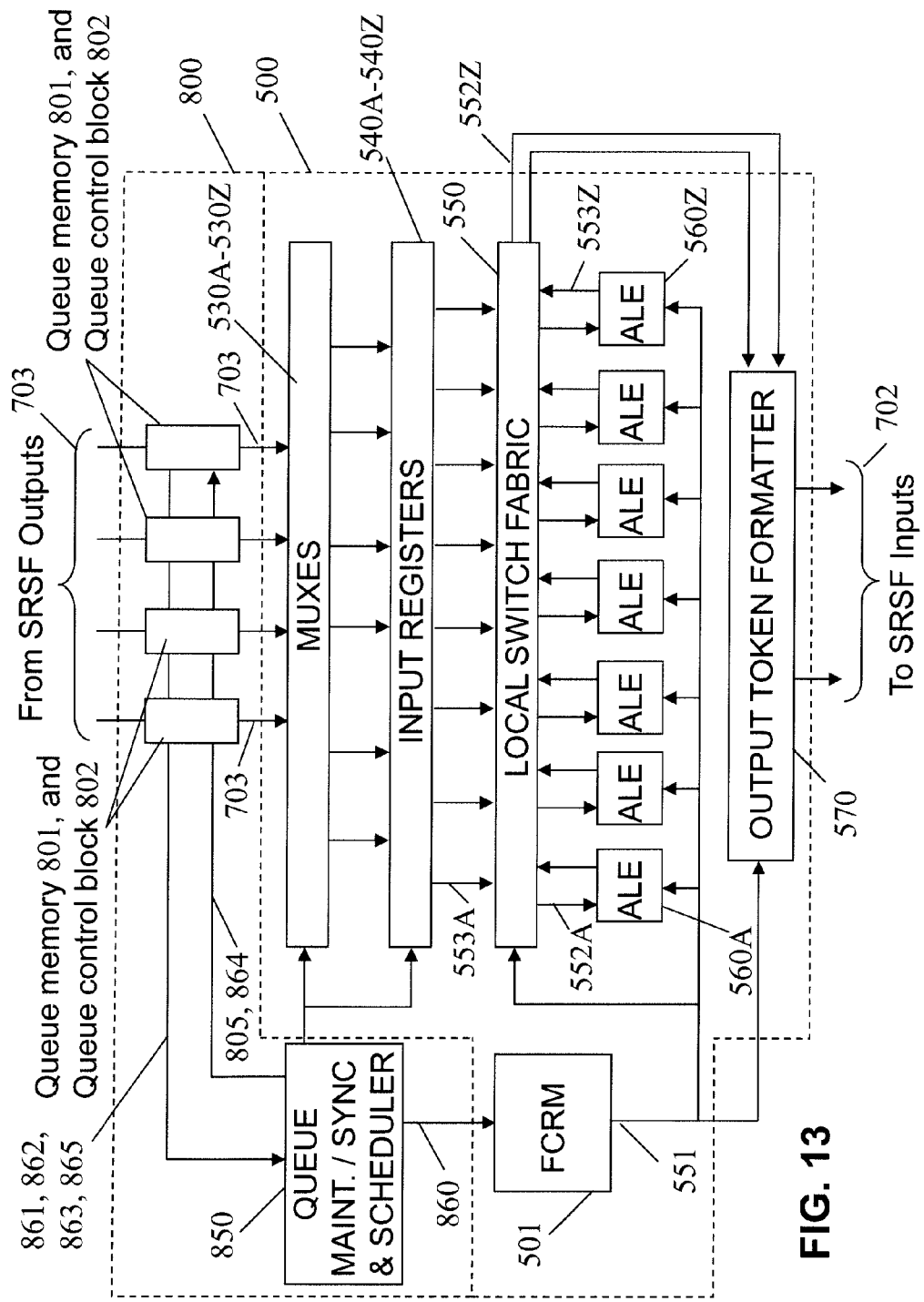
FIG. 13 shows a logical block diagram of a function block comprising a group of arithmetic logic elements interconnected via a local switch fabric for use in example embodiments of the present invention.

The grouping of queue memories 851 with a switch fabric 700, as shown in FIG. 9 is illustrative of an embodiment of the invention. Those familiar with the art will realise that processor array resources, such as the function blocks 500, queue memories 851 and switch fabric 700 can be partitioned and/or grouped differently to obtain the same functionality. For example, the queue memory block 800 could be separate from a switch fabric and be grouped together (be considered as an internal block) with a function block 500 or it could be considered as a separate circuit block (as shown in FIG. 13) receiving tokens output from a switch fabric 700 on bus 703 and outputting data to one or more function blocks 500.

In yet another embodiment, empty flags 862 and the ¾ full flag 863 & Full flags 865, are connected to the local programmable clock generator (not shown). In times of token traffic congestion or near congestion, perhaps due to bursts of token processing in variable data applications, then the programmable clock generator can be instructed to increase the clock frequency in order to increase the processing and hence the throughput of the associated thread queues experiencing congestion. Another advantage of employing a local programmable clock generator is that the optimum clock frequency can be selected to process the arriving tokens and keep the power dissipation to a minimum. Hence the processor array is adaptive to processing requirements at that particular time, which is useful for applications that generate bursty or variable length data packets. If the FIFOs are empty, indicating there is nothing to process, then the programmable clock generator can be used to inhibit the clocks to the processing and memory logic of a function block 500 to reduce the overall power dissipation. The arrival of tokens in the thread queues will automatically enable the programmable clocks again by virtue of the empty flags changing state.

Figure 11:
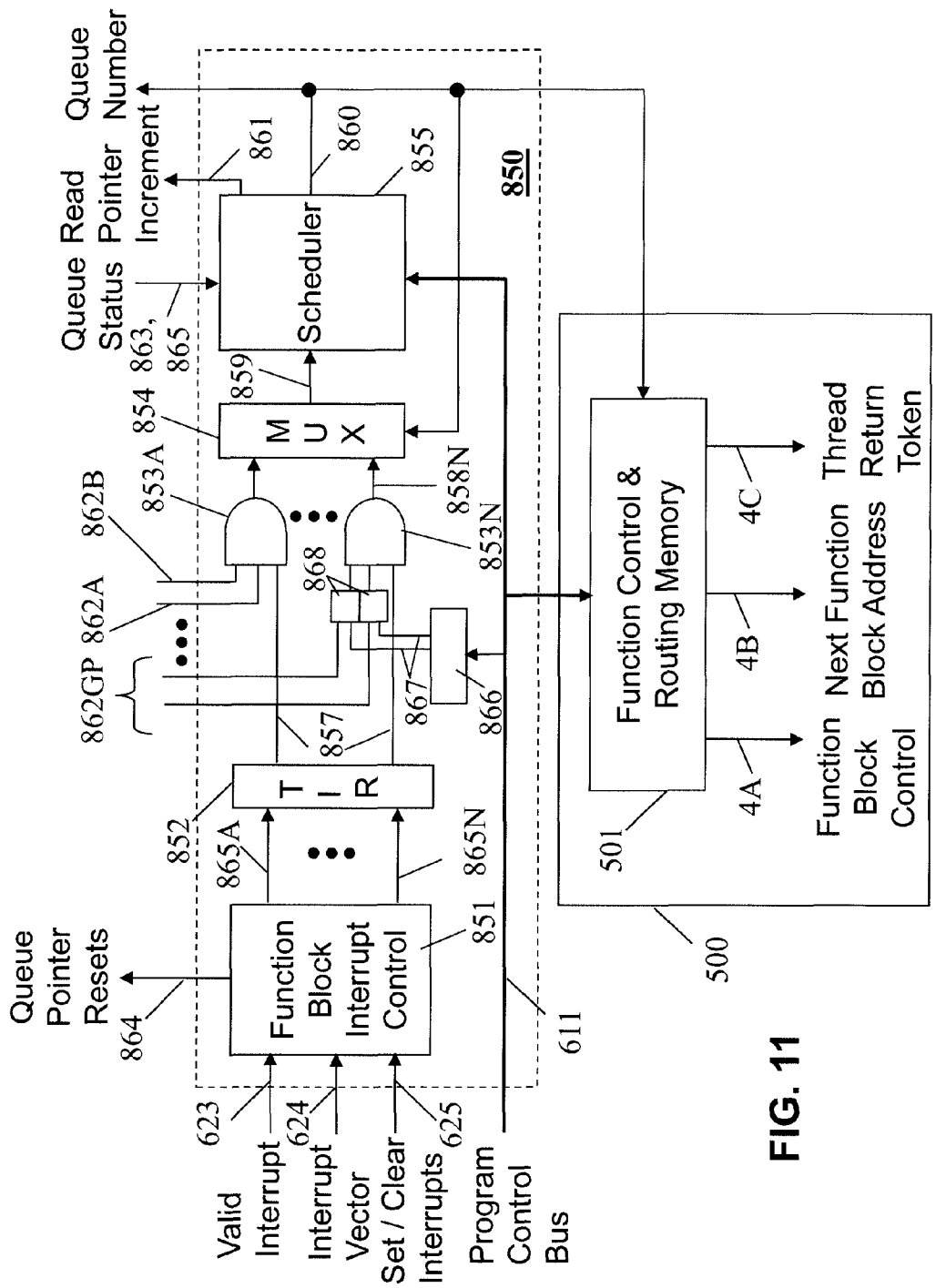
FIG. 11 shows the queue maintenance & thread synchronisation logic for use in example embodiments of the present invention.

A function block 500 that has P operand input ports, where P is a positive integer, will have each of its input ports connect to a corresponding switch fabric output port 703. Data tokens 3 are transferred from one function block 500 to another via the self-routing switch fabric 700 based on appended addresses or routing tags. Therefore, the route taken by each data token from the same thread is the same. Consequently, data from the same thread will not arrive at any queue or function block out of sequence. Before a function block can perform an operation on its input data all operand data for all ports must have been received and stored in each associated queue. Once all the relevant data has been received then the scheduler can read and present the data to the function block for processing. The resultant data is then reformatted into a different type of token and transferred to a switch fabric input 702. The decision to simultaneously read multiple queues associated with a function block is based on the empty flags 862 from each queue (note, two operands and two empty flags are described in this example as shown in FIG. 11). Empty flags 862A, 862B from related operand queues for the same two operand input function block 500 are grouped together, shown as 862GP. The grouping of selected empty flags 862 from different thread queues is fully programmable (programmable circuit means are logic circuit means that allow a plurality of input signals to be combined to implement any logic function of those input signals for example, any combination of the queue empty flags 862A to 862Z and the outputs 857A to 857N from the thread interrupt register to be combined to form a group 862GP) and the grouped queues are referred to as programmable interconnected or coupled thread queues. For example, assume data from two related threads needs to be added together. Data for operand A is received and stored in queue 3, say of the switch output port that connects to the function block's A operand input. Due to the delays in the different data paths, data for operand B may arrive and be stored in queue 3 (of the switch output port that connects to function block B operand input) at a later time. Therefore, the thread queue scheduler 855 cannot read the data from the two separate thread queues and transfer it to the function block inputs until data for both operands have been stored in their respective thread queues connected to each respective function block input. When both the empty flags from each queue indicate that their respective queues are not empty, then the data is synchronised (that is, the thread queues are synchronised) and the thread queue scheduler 855 can read data from the queues 801. The selected read pointer is incremented by the schedule using a read pointer increment signal 861 when reading data from the corresponding queues. The empty flags 862A, 862B from related queues (and hence threads shown in the example of FIG. 11) are logically ANDed together. The output 858A to 858N from each AND gate 853A to 853N (individually and collectively referred to as AND gates 853) is input to a multiplexer 854 whose select lines are driven by the thread queue scheduler 855. The thread queue scheduler 855 tests the value of multiplexer (selected queue) output 859 and if it is true then the selected queues are read and the associated pointers updated. The thread queue scheduler 855 also accesses the function control and routing memory block 501 to obtain the next function block address and any token data that may need to be transferred. If the multiplexer output 859 is false then the selected thread queues are not read. The empty flags 862 are therefore used to synchronise the input data to the function block. It can be seen thread synchronisation is implicit in the queue scheduling operation and does not require the hardware and processing overheads of prior art thread synchronisation schemes. Of course, if the function block 500 only requires a single operand, for example a barrel shifter, truncation, normalization, inversion, then data can be input to the function block from the queue as soon as it scheduled. In this case, only a single empty flag from the corresponding thread queue is used by the thread queue scheduler to determine if token are available for input to the connected function block 500. The other empty flag inputs to the AND gate 853 are set (programmed) to a logic 1. This is achieved by setting a logic 1 in the corresponding bit of the function block empty flag control register 866. Each individual output 867 is logically OR-ed with an empty flag signal 862 before being input to a AND gate 853. For clarity, only the logic circuits for AND gate 853N are illustrated. The programmable logic means described above to group the various empty flags are illustrative and other programmable logic means can be employed to provide the same functionality in another embodiment of the invention. In addition to a join operation (the parent process blocks until all the processes spawned by the current fork operation complete), the programmable logic means can also be programmed to implement other join operations. For example, a 'join_any', where the parent process blocks until any one of the processes spawned by the current fork operation complete and a 'join_none', where the parent process continues to execute in parallel with all the processes spawned by the fork operation.

The thread queue scheduler 855 can read each queue in one of several ways. The scheduling algorithms employed include round robin, weighted round robin, first-come first-served or priority based scheduling. The thread queue scheduler 855 can also operate asynchronously and at a faster rate than data is input. The scheduling rate can also be proportional to the queue levels. If a queue level exceeds a predefined level, for example ¾ full 865, then the thread queue scheduler 855 can issue a flow-control token 3, which is routed back to the originating thread coordinator indicating that it should reduce the rate at which data is being input. In another embodiment, the flow control token is broadcast to all function blocks 500 and those associated with the thread (group number) can reduce their token outputs by a predefined amount.

If an interrupt occurred, then it may be required that processing for a particular thread would need to be suspended while the interrupt was serviced. Because the processing for a thread is distributed across the processor array then each function block involved with the thread processing will need to receive the interrupt signals. In general, the interrupts are controlled and initiated by a thread coordinator 600. If an interrupt occurs and it is accepted (not masked or of a lower priority if other interrupts are currently being serviced) then the thread coordinator 600 will issue an interrupt valid signal and an interrupt vector or interrupt group number. This data is passed to all function blocks 500 via a dedicated bus constructed from signal 623,624 and 625. Each function block interrupt controller 851 registers the interrupt data and outputs valid interrupts on corresponding signal 865, illustrated as 865A to 865N. Function blocks implementing operations for the same thread are associated with the same group and are allocated a group number. As a function block can be shared and used by many different and independent threads (the same instructions from different threads are therefore mapped to the same function block) a function block may have many different group numbers associated with it. The process of allocating the same instruction or group of instructions from different threads so they share or utilise the processing resources of the same function block so that a function block utilisation is maximised for a specific group of algorithms or threads is referred to as optimally mapped or thread load balancing. The level to which a function block is shared can be determined at simulation time using the Electronic Design Automation (EDA) tools 1000. Each function block stores a list of the group numbers a function block is associated with. Associated with each group number is a queue number. Function blocks that have the same group number do not necessarily have to have the same queue number associated with the same group number. This technique allows queue allocation flexibility to different threads depending on the utilisation of a function block for a particular algorithm. The allocation of group numbers and the mapping of group numbers with queue numbers are performed by dedicated compiler tools 1200 used to design algorithms for the shared resource multi-thread processor array 100. When an interrupt occurs and is accepted then the interrupt control 606 will output the interrupt group number, which is confirmed by a true signal of the interrupt valid line. This will be registered by all the function blocks 500 and compared to their stored group number lists. The comparison can be performed in parallel or sequentially. One way to implement the latter is to use a Contents Addressable M memory (or CAM—not shown). If there is no match the interrupt is not intended for that particular function block. If there is a match then the queue number associated with the group number is read, decoded and a bit is set in the thread interrupt register 852. Each output 857A to 857N from the thread interrupt register 852 is used to drive an AND gate 853 (illustrated as 853A to 853N) that is also driven by the same queue empty flag signals 862. If thread processing needs to be suspended when an interrupt occurs then setting a thread interrupt register bit 857 to logic 0 will inhibit the thread queue scheduler 855 from reading a queue, even if it is not empty. Consequently, data processing for that particular thread will now be suspended. Once the interrupt has completed the thread coordinator can reset the thread interrupt register 851 (logic 1), which will enable the thread queue scheduler 855 to restart reading data from the previously suspended queue. If after the interrupt has completed execution the suspended thread needs to be stopped and cleared then the originating thread coordinator 600 will output an interrupt clear signal together with a group number. All function blocks will again register this interrupt data and those matching the group number will decode the message and proceed to reset 864 the queue pointers for the selected thread queue. As the selected queue pointers have been reset, the empty flags will indicate the queue is empty and the thread queue scheduler will not read any data for that queue until new data is stored in the queue. Hence the previous thread will have been "flushed". Though a particular queue will have been suspended, the thread queue scheduler will still process the other active queues. In a preferred embodiment, the thread queue scheduler 855 can temporarily re-allocate the suspended timeslots to the other queues to aid processing throughput by stealing the now free timeslots for the suspended queue. A timeslot is the time required by the thread queue scheduler 855 to read a particular thread queue or set of associated thread queues.

The thread synchronisation methods described so far concern sub-threads or parallel threads that are related to the same main thread. There are occasions when different threads, which are operating simultaneously, need to access and or update the same registers and memory locations. The order in which these memory accesses occur is critical and they must be performed in the correct order. To achieve this a thread lock or thread wait mechanism must be employed. This can be achieved with the present invention if an empty flag 862 from a thread queue (referred to here as an inter-thread synchronisation queue) is grouped by programmable circuit means to other empty flags to form a group 862GP. If an inter-thread synchronisation queue is empty then it will inhibit the group from becoming active until a token is written to/received by the inter-thread synchronisation queue. Such a token would be issued by another thread when it had performed its tasked and released the relevant function block resources 500 for access by the waiting thread. An inter-thread synchronisation queue would only need to store a single bit for each received token as it only needs to indicate a wait or no wait condition. This mechanism can be extended to implement more complex or elaborate inter-thread wait and resource sharing schemes.

In another embodiment of the invention, the thread lock or thread wait mechanism can be implemented using an inter-thread synchronisation register (not shown). The inter-thread synchronisation register is similar to the thread interrupt register 852 in that it consists of individual programmable bits whose outputs connect to the AND gates 853 in order to inhibit or active a programmable group 862GP. An inter-thread synchronisation register is connected to the program control bus 611 so its contents can be set at initialisation, for example. It is also connected by circuit means to a group of outputs (field) of an associated Function Control & Routing Memory 501 enabling individual bits of the inter-thread synchronisation register to be set or reset simultaneously. By enabling and disabling the AND gates associated with the thread groups 862GP, different threads can be forced to wait to access a function block's resources. For example, when the current thread had completed its operations an output bit from the Function Control & Routing Memory 501 could set the bit enabling a waiting group to proceed and access a function block's resources. At the same time it another bit would reset a bit to disable the previous group to prevent it (thread wait or thread lock) from accessing the function block resources.

Figure 12:
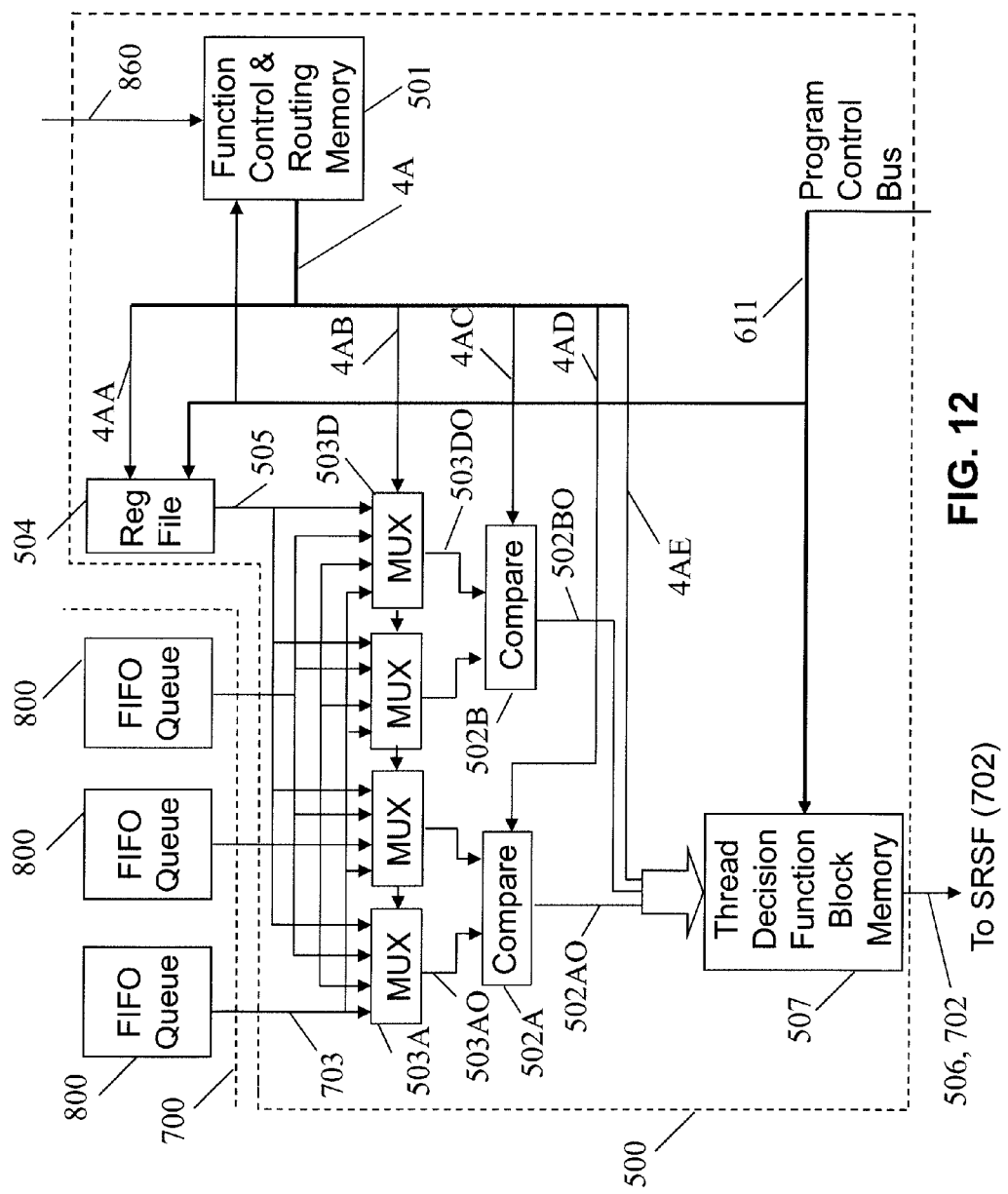
FIG. 12 shows an example of a conditional control function block for use in example embodiments of the present invention.

Function blocks 500 implement a variety of different functions. They are generally used to implement data path functions, such a data storage (memory or register files), arithmetic and logic functions (both coarse grained and fine grained). They are also used as part of the control path to implement conditional branch functions. These conditional thread flow control blocks 500 contain many logic circuits and are in some respects very similar to their data path counterparts. A conditional multi-way branch function block is shown in FIG. 12. This particular function block 500 can test several conditions in parallel that are of the form: If ((A<comparison>B)<logic function>(C<comparison>D)) Then Branch X, Else Branch Y. For example, If (A<B) && (C==D) Then Branch X, Else Branch Y.

Like other function blocks 500 each operand input is connected to a switch fabric output 703. The function block of FIG. 12 has three such connections. It also has an internal register file 504. The register file output 505 and the three operand inputs are each connected to the inputs of four 4:1 multiplexers 503A to 503D allowing any of the four inputs to routed to a multiplexer output 503AO to 503DO respectively and subsequently to any of the comparator input. The select lines of each 4:1 multiplexer are controlled by data output from the Function Control & Routing Memory 501. The data is a sub-field 4AB of the function block control field 4A. Sub-field 4AA is used to select a register output from the register file 505, sub-field 4AC is used to select the comparison function of comparator 502B, sub-field 4AD is used to select the comparison function of comparator 502A and sub-field 4AE is an offset address, which is concatenated with the outputs 502AO, 502BO of the two comparators 502A and 502B respectively to form an address that is input to the Thread Decision Function Block memory 507. The comparators 502A and 502B both have two inputs A and B and can perform the comparison functions A equals B, A greater than B and A is less than B. Because the function block output is conditional on several inputs it is not known a priori which branch/thread will be taken. Consequently, the next address data and token data are not stored in the Function Control & Routing Memory 501, but in the Thread Decision Function Block memory 507. The output of the Thread Decision Function Block memory 506 forms the input to a self-routing switch fabric 702 and is a token 3. Concatenating the offset address 4AE and the output of the two comparators forms the Thread Decision Function Block memory address. The two bits from the comparators forming the two least significant bits of the address. The offset address 4AE is provided so different logic functions can be implemented by different threads. The contents of each Thread Decision Function Block memory location contain a token 3. Different locations will have different tokens 3 corresponding to the different thread branches to be taken if the set conditions become valid. An alternative to using the memory to indirectly implement the logic function is to use a programmable logic function.

The register file 505, Thread Decision Function Block memory 506 and the Thread Decision Function Block memory 507 are fully programmable and can be loaded via the Program Control Bus 611.

As described previously, at some point in a thread's execution a thread may fork into several separate parallel threads. In order for the output of a function block 500 to initiate a plurality of separate parallel processes, a mechanism is required where the token 3 output from a function block can be used to generate a plurality of separate tokens that are used to initiate the plurality of parallel sub-threads or processes. One method of achieving this is to perform a multicasting operation. The parallel sub-thread initiating token 3 is input to a multicasting function block 520. Data contained in the token is used to address a look-up table, which contains a group of tokens that need to be issued to initiate the separate parallel processes. Each token in the multicast group will be different, as they will have different function block addresses. There are several ways to implement the multicast mechanism. One method is to use a Content Addressable Memory (CAM) operating in conjunction with a Finite State Machine (FSM) that searches and outputs the corresponding matching tokens in the multicast group. Another method would be to use a linked-list in memory operating in conjunction with a Finite State Machine (FSM) that searches and outputs the corresponding matching tokens in the multicast group. The first token in the list would be pointed to by data in the received initiator token 3. Each subsequent token in the linked list would contain a field that pointed to the next token in the multicast group. The FSM would cycle through the linked-list until all the tokens 3 in the multicast group had been issued and transferred to the connected switch fabric.

Several function block resources 500 are considered local if they are interconnected using the same basic self-routing switch fabric 700. Such a structure is referred to as a level-1 function block 900 and the self-routing switch fabric interconnecting them a level-1 switch fabric 700A. A group of level-1 function blocks can be interconnected using another self-routing switch fabric. This switch fabric is referred to as a level-2 switch fabric 700B and the grouped function block a level-2 function block 910. A plurality of level-2 function blocks can then be tiled and they themselves interconnected by separate self-routing switch fabrics 700C, referred to as level-3 switch fabrics. Those familiar with the art will recognise that various switching architectures can be constructed, such as multi-dimensional, butterfly fat tree, fractal or hierarchical switch structures enabling different shared resource multi-thread processor arrays to be implemented. In another embodiment of the invention the level-2 switch fabric 700B and or level-3 switch fabric 700C can employ one of a plurality of queuing and scheduling schemes or means. The plurality of queuing schemes includes input buffered thread queues, intermediate buffered thread queues, output buffered thread queues (also referred to as a buffered output port) or any combinations of these buffer schemes. The plurality of scheduling schemes or means includes priority based, round robin, weighted round robin and first-come first-served scheduling.

Figure 14:
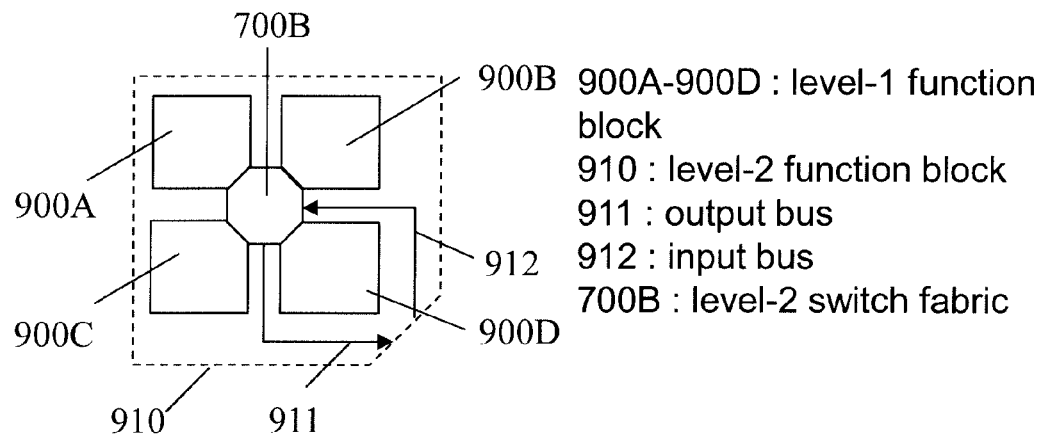
FIG. 14 shows four level-1 function blocks instantiated as a level-2 function block for use in example embodiments of the present invention.
Figure 15:
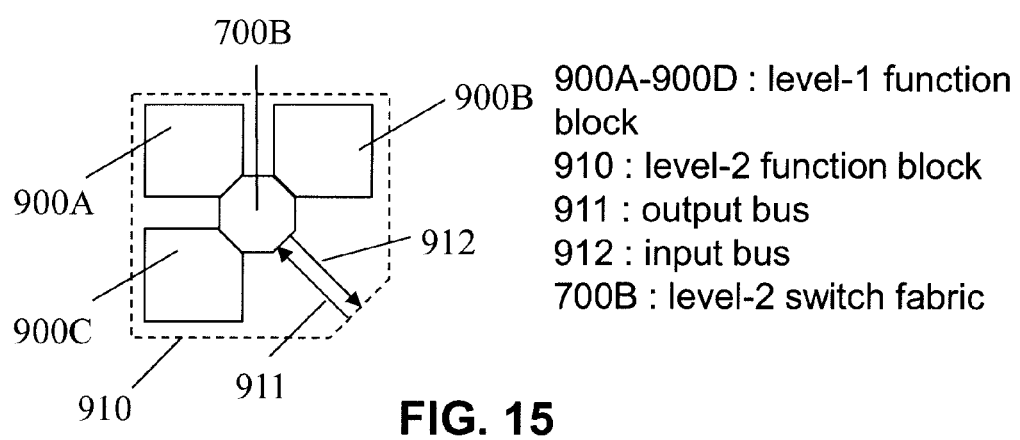
FIG. 15 shows three level-1 function blocks instantiated as a level-2 function block for use in example embodiments of the present invention.

Two versions of a level-2 function block 910 are shown in FIG. 14 and FIG. 15 respectively. The level-2 function block 910 of FIG. 14 has four level-1 function blocks 900, illustrated as level-1 function blocks 900A to 900D (individually and collectively referred to as level-1 function blocks 900) interconnected via a level-2 switch fabric 700B. Communication between a level-2 switch fabric 700B and a level-3 switch fabric 700C is input ingress bus 912 and output or egress bus 911. The direction of the data flow is taken from the level-2 perspective. The level-2 function block 910 of FIG. 15 has three level-1 function blocks 900, illustrated as level-1 function blocks 900A to 900C (individually and collectively referred to as level-1 function blocks 910) interconnected via a level-2 switch fabric 700B. Communication (token transfer scheme) between a level-2 switch fabric 700B and a level-3 switch fabric 700C is input bus 912 and output bus 911. The reason having fewer level-1 function blocks 900 is that the level-1 function blocks 900 may be more complex and or require greater data bandwidth provided by using the extra switch ports of the level-2 switch fabric 700B that would have been used by a level-1 function block.

As shown in FIG. 16, four level-2 function blocks 910A to 910D can be grouped via a level-3 switch fabric 700CA to form a level-3 function block 920A. These level-3 function blocks 920, illustrated as level-3 function blocks 920A to 920Z (individually and collectively referred to as level-1 function blocks 920) can then be tiled and themselves interconnected by separate self-routing switch fabrics 700C, which are referred to as level-3 switch fabrics and illustrated as level-3 switch fabrics 700CA to 700CZ in FIG. 16 (individually and collectively referred to as level-3 switch fabrics 700C). Each level-3 switch fabric 700CA to 700CZ has eight dual port communication links, illustrated as a dual port communication links 930A to 930H in FIG. 16 (individually and collectively referred to a dual port communication link). A dual port communication link 930A to 930H consists of an ingress port 931, an egress port 932 together with their associated queues (not shown). Each dual port communication link 930A to 930H employs a token transfer scheme (data transfer protocol) means and associated control signal means to transfer tokens 3 between an the egress port 932 of one particular switch fabric and the ingress port 931 of a separate switch fabric. The input bus 912 and output bus 911 of a level-2 function block connect to an egress port 932 and ingress port 931 respectively.

The token transfer scheme or protocol employed on an ingress port 931 or an egress port 932 of a dual port communication link 930A to 930H and on the input bus 912 and the output bus 911 is selected from a plurality of token transfer means, the plurality of token transfer means including synchronous token transfer means and asynchronous token transfer means.

Each queue, port and switch fabric has a unique address. The routing tag or destination address field 2 of a received token 3 is compared to the address allocated to a particular switch. Based on the results of the comparison, a token 3 will either be transferred to another switch fabric at the same level (if both the column and row address do not match those of the current switch fabric) or be transferred firstly to a switch fabric one level down and then be transferred to a queue in the selected output port.

As the level-2 switch fabric 700B and level-3 switch fabric 700C are not connected directly to any function blocks 500, each switch port within a switch fabric operates independently and at a rate governed by the traffic flows between switch fabrics.

As described previously, a function block 500 can be a macro function block, which can implement a plurality of arithmetic and logic functions. FIG. 13 shows an example of a macro function block. This type of function blocks allows many arithmetic and logical operations to be performed in parallel. It also allows operations to be performed simultaneously on data/tokens from different threads as described later. As shown in FIG. 13, the inputs to the macro function block 500 come from a plurality of queue memories 800 (four are shown in this example). These separate queue memories are each connected to an output of a switch fabric 703 allowing tokens from different threads to be received simultaneously. Each thread queue is controlled and maintained by queue maintenance & thread synchronisation logic 850. The queue maintenance & thread synchronisation logic 850 includes logic means to implement a thread queue scheduler 855 that is used to read data from the selected thread queues and load the data into input registers, illustrated as 540A to 540Z (individually and collectively referred to as input registers 540). Data from a selected thread queue is routed to the selected input register via one of a plurality of multiplexers, illustrated as 530A to 530Z (individually and collectively referred to as multiplexers 530). It is therefore possible to read a plurality of thread queues and load individual input registers 540 simultaneously. The queue maintenance & thread synchronisation logic 850 can also be used to decode which group or groups of empty flags have been triggered and output the associated address on bus 860 to address the function control and routing memory 501. The function control and routing memory 501 contains control instructions (each divided into several control fields) to control the local switch 550, control the various arithmetic logic elements, shown as 560A to 560Z (individually and collectively referred to as arithmetic logic elements 560). The outputs from the function control and routing memory 501 are routed to the local switch 550, arithmetic logic elements 560 and output token formatter 570 on bus 551. Each arithmetic logic element 50 can perform arithmetic functions, logic functions or data storage functions, such as memory or a register file, They can also be individual processing cores, such as Reduced Instruction Set Computer (RISC) core, The function control and routing memory 501 also contains control fields that form the destination address of the next block to transfer the resultant data/token to. The merging of the resultant data with a destination address and transmitting it to the switch fabric input is performed by the output token formatter 570.

The local switch allows any combination of input registers 540 and arithmetic logic elements 560 to be interconnected, Outputs from the input registers and arithmetic logic elements are input to the local switch inputs 553A to 553Z (individually and collectively referred to as local switch inputs 553). Outputs 552A to 552Z (individually and collectively referred to as local switch outputs 552) from the local switch 550 are connected to the arithmetic logic element inputs and the output token formatter 570.

Each word output from the function control and routing memory 501 is used to implement a set of parallel operations. These can relate to a single thread group or several thread groups. For example, suppose the instruction at location N in the function control and routing memory is selected when data tokens arrive for threads A, B and C and the operation to be performed is (A*B)+C. These operations can be performed in parallel in a single clock cycle. Now suppose that queues A and B have available tokens and the thread queues C, D and E simultaneously receive tokens via the connected switch fabric. Also assume that thread queues A, B and C form one group and thread queues D and E form a separate unrelated group and the second group operation is E-D. The instruction for the second group is stored in location S of the function control and routing memory 501. These operations could be scheduled one after the other. However, if these two thread groups use separate and available arithmetic logic element 560 resources then both thread groups can be performed simultaneously. This is achieved by having a third instruction at location V in the function control and routing memory 501 that is selected when both thread groups are active simultaneously. The instruction at location V is a combination of the individual instructions at locations N and S. As there are two outputs from the local switch to the output token formatter and then to the switch fabric there is no resource contention. The same simultaneous operations can be achieved using a dual port or multi-port memory (not shown), though only instructions N and S would need to be stored in the dual port memory used in the function control and routing memory 501.

Data block transfers between memory based function blocks 500 is inefficient if no operations are performed on the data during the data transfer. The transfer also wastes valuable switch fabric interconnection resources. One way to avoid these inefficiencies would be for a function block 500 to read one or a plurality of memories when the data is required for processing in a single operation rather than separate independent operations. In order to achieve this a function block (in this example referred to as a processing function block) would need to know when one or more data blocks were available for access. When a function block had completed its operations and stored the resulting data in memory it would issue a Pending Data Block token 3P, which would be routed to the next processing function block in the algorithm sequence. If more than one data block is required by the next function block then in order to perform the subsequent join operation the function block will need to receive and decode the corresponding number of Pending Data Block tokens via its thread queues. Each Pending Data Block token 3P contains the start address and block length of the data block to be accessed. Before the processing function block can process the data in one or more memory function blocks it must first gain access to each memory function block and reserve the path and switching resources in order to establish and maintain an open connection between the memory function blocks and itself. This is achieved by the processing function block issuing one or more Data Block Request tokens 3R to each of the memory function blocks 500. On receiving a Data Block Request token 3R, the corresponding memory function block decodes the token (which contains the start address and data block length) and issues a return Data Block Grant token 3S when it is free to do so. The return Data Block Grant token 3S will reserve switching resources as it is transferred back to the processing function block. Each received Data Block Grant token will be stored in a thread queue. Reception and decoding of the required number Data Block Grant tokens will trigger the processing function block to begin reading the data blocks from the selected memory function blocks and begin processing the data. In order to save time and reduce token transactions, data will start to be read from each memory and effectively be appended to a Data Block Grant token. Another method would be for a processing function block 500 to issue a Data Block Start token (not shown), which would be received and decoded by each corresponding memory function block instructing it to begin transferring data from the selected addresses. The interconnections between the function blocks and switch fabrics and within the switch fabrics themselves, flow control means are provided to take account of different path delays. The resultant data block can be stored locally or in a memory function block that has also been granted access to the processing function block. A memory function block 500 can be a multi-port memory allowing simultaneous access by more than one other function block. Once all data has been read from the granted memory function blocks, the processing function block will issue Data Block Release 3T token for each accessed memory function block. A Data Block Release token frees up the previously reserved switch fabric resources as it is routed to the destination memory function block. A memory function block receiving a Data Block Release token 3T will deselect and free up the previously reserved memory resources for use by other function blocks.

The shared resource multi-thread processor array 100 according to an example embodiment of the present invention can be embedded as a core and form part of a more complex System on Chip (SoC) device 3000. Alternatively, the shared resource multi-thread processor array 100 according to an example embodiment of the present invention can be used to form a complete integrated circuit device. Though reference has been made to CMOS fabrication processes for implementing the processor array 100 this does not in any way limit fabrication of the example embodiments of the processor array 100 to this process. The example embodiments of the processor array 100 can be fabricated in any available integrated circuit fabrication process, including emerging fabrication technologies, for example those based on graphene transistors and or optical interconnect.

The memory means used to store program data in the function control & routing memories, queue maintenance & thread synchronisation blocks, queue pointers, register files and function block registers can be volatile memory means or non-volatile memory means. Non-volatile memory means allows a device based on the processor array 100 to power-up in a know state and will not require configuring before use.

In another example embodiment, one or a plurality of thread coordinators 600 and function blocks 500 can be configured to implement test circuitry to check the operation of the various thread coordinators 600, function blocks 500 and self-routing switch fabrics 700. If any of the latter circuit elements are found to be operating incorrectly these fault conditions can be reported to a thread coordinator 600 so they are not included in the implementation of live operational circuits. The threads would therefore be rerouted to working function blocks. The mapping of threads to alternative function blocks and thread coordinators is performed using a dedicated compiler, which uses the test status data outlined above as part of the mapping process.

In another example embodiment of the invention, the processor array 100 can be configured to implement a neural network with a plurality of function blocks 500 being used to weight and sum inputs from a number of threads. The interconnection of the switching fabrics 700 and function blocks 500 allowing various neural network architectures or types, such as feed-forward and back propagation, to be implemented. As a function block's resources 500 can be shared by different thread groups, a function block 500 can be act as a node for multiple input groups.

In yet another example embodiment of the invention the bit width of the instantiated function blocks 500 does not have to correspond to the bit width of the input bus 912 and output bus 911 or that of the communication links 931, 932. Each instantiated function block 500 has a bit width J, where J is an integer greater than or equal to 1. For example, each function block 500 could be operated as a bit serial function block having bit width of 1. This would be advantageous as more and more SoCs are incorporating high-speed serial communication links to transfer data between on chip blocks and modules and alleviate the need to convert between serial and parallel (and vice versa) formats.

The architecture of example embodiments of the present invention enables the processing of independent threads at different rates. In a preferred embodiment of the current invention asynchronous logic (also referred to as clockless logic or self-timed logic) can be employed to implement the circuits used in the shared resource multi-thread processor array 100. There are several advantages to using asynchronous logic, namely reduced power consumption, as the logic will consume zero dynamic power when there is no logic activity, and a low electromagnetic signature because of the diffuse nature of digital transitions within the chip. This makes these devices an attractive option for use in portable or battery operated applications.

There are several ways to implement asynchronous logic circuits, including bounded delay asynchronous circuits, delay-insensitive circuits, Differential Cascode Voltage Switch Logic (DCVSL) and Quasi Delay-Insensitive (QDI) asynchronous circuits. An asynchronous shared resource multi-thread processor array 100 can be designed using any of these asynchronous design techniques allowing the design advantages mentioned previously to be utilized in an asynchronous shared resource multi-thread processor array core or device. This allows thread segment reconfiguration and related algorithm processing to be performed asynchronously.

It is becoming increasing difficult to implement and distribute global clocks for system on chip (SoCs) devices. The fine geometries of CMOS fabrication processes enable designers to include ever more functionality on a device. However, this causes problems since signals on adjacent wires interact due to cross coupling and the wire delay increases for global wires. The interconnect effects makes it problematic to transfer information over large distances in one clock period and block synchronization becomes a serious issue, for example completing "timing closure".

In yet another example embodiment of the current invention the data transfer protocols on the communication links between circuit blocks (function blocks, thread coordinators and self-routing switch fabrics) is by using a Global Asynchronous Local Synchronous (GALS) scheme. With this technique it is possible to remove the global clock and replace it with an asynchronous communication scheme. Each block consists of an asynchronous wrapper and a synchronous module. The synchronous module handles all computations and the asynchronous wrapper handles all communication with other GALS blocks.

Electronic Design Automation (EDA) Tool Chain.

Figure 17:
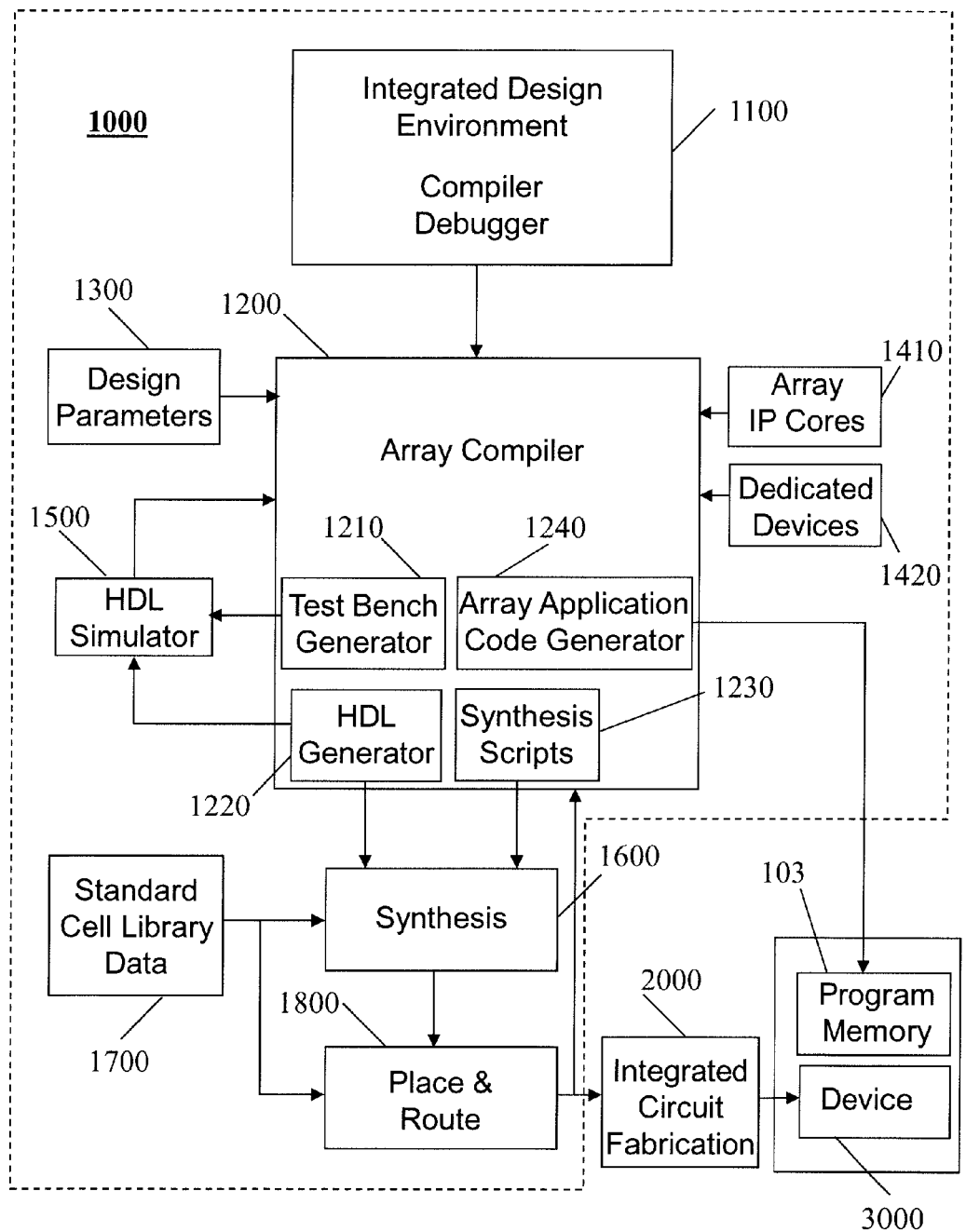
FIG. 17 shows an Electronic Design Automation (EDA) tool chain and processor array device manufacturing flow diagram.

In order to perform any useful tasks the processor array 100 will need to be loaded with program data. The program data must conform to a predefined format for it to be decoded and used correctly by the processor array. Before the program data can be generated a designer must first perform a number of tasks to first implement and test algorithms required to implement the overall application program. FIG. 17 illustrates a flow diagram of an example process for creating a device 3000, such as a SoC, with the designs and concepts discussed herein. The information representing the components and/or process operations for the circuitry in processor array 100, may be contained in a cell library, soft instructions in an electronic circuit design generator, within a machine-readable storage medium storing this information. The EDA tool chain may store the data representing the processor array logic circuitry on a machine-readable storage medium. The EDA tool chain may be implemented in software as a set of data and instructions stored on a machine-readable medium. A machine-readable storage medium may include any mechanism that provides data in a form readable by a machine, such as a computer. A machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations may also be executed in a distributed or networked computing system where the machine-readable media is stored on and/or executed by more than one computer.

A designer will first use an Integrated Design Environment (IDE) 1100, which is used to enter, compile and debug high level code used to implement the desired algorithms and tasks. An example of an Integrated Design Environment 1100 would be the Eclipse IDE (Registered Trade Mark). The high level code will be a parallel processing language, such as OpenMP, MPI (Registered Trade Marks) or a dedicated parallel processing language designed to work specifically with the processor array 100. Though the compiled code from the IDE can run on a targeted processor it is not true parallel code or in the correct format for processing by the processor array 100. The IDE is used for functional and algorithm development.

The output from the IDE 1100 is input to the array compiler 1200. The array compiler consists of several tools, namely the test bench generator 1210, the HDL generator 1220, the synthesis script generator 1230 and the array application code generator 1240. At this stage in the design process a designer will need to make a range of implementation decisions. Firstly the designer will need to decide if the design is to be implemented in a custom SOC device 3000 or one of several predefined devices each having its own architecture, interfaces and available processing resources. In the latter case, the array compiler 1200 will read formatted data files 1420 that describe the architecture, interfaces and available processing resources for each predefined device 100. Other design parameters 1300, such as silicon area, power dissipation, clocking, throughput, the number and type of threads to be used, are also input to the array compiler 1220. This data will be used by the array compiler 1200 to map the algorithms, functions and tasks of the compiled code from the IDE onto the processing resources for the selected predefined device. By altering the design parameters 1300, the designer can explore architectural trade offs and so optimize the design. The array application code generator 1240 is then used to generate the program code to run on the processor array 100. This data will be formatted for storage in the program memory 103.

If the designer has chosen to implement the design in a custom SOC then the array compiler 1200 will read formatted data files 1410 that describe all the Intellectual Property (IP) cores are used to form an shared-resource processor array 100. This data will be used by the array compiler 1200 to map the algorithms, functions and tasks of the compiled code from the IDE onto the Intellectual Property (IP) cores are used to form a shared-resource processor array 100. At this stage there will be many design trade offs and the array compiler can be used for architectural exploration and thread analysis (detect thread race conditions, etc) allowing the designer to optimize the overall design. A selected design can be converted into a Hardware Description Language (HDL) using the HDL generator 1220. The HDL generator can output Verilog, SystemC and VHDL (Very High Speed Integrated Circuit Hardware Description Language). At the same time, the designer can develop and generate test benches in order to verify functional operation and timing analysis. The test bench generator 1210 is used to generate test benches in the same language format as the selected HDL output format. The HDL output and test bench outputs can be input the to a HDL simulator 1500, which is used to simulate the design in order to verify functional operation and timing analysis. Any errors or bugs can be corrected and the process repeated until the designer is happy with the results.

At this stage the design does not take into account the technology that the SoC will be fabricated in. To convert the HDL to transistors a synthesis process 1600 needs to be implemented. In order to "guide" the synthesis process so the synthesis tool 1600 will implement the best solution synthesis scripts are generated 1230 by the array compiler 1200 and input into the synthesis tool 1600. In addition, the synthesis tool reads standard cell library data 1700. The output from the synthesis tool 1600 are input into the place and route tool 1800 which is used to layout the circuits for device fabrication. Timing data produced by the place and route tool is now included in design files and the overall design is again input into the HDL simulator for testing and verification. This process is repeated until timing closure has been verified and completed. The final output from the place and route tool, together with any test files are sent to the device manufacturer for device fabrication 2000. The device 3000 can be fabricated using custom design processes or any standard cell processes, such as 0.35 um, 0.25 um, 0.13 um, 90 nm, 65 nm, 45 nm, or smaller technologies.

Although the invention has been described herein with reference to particular preferred embodiments, it is to be understood that these embodiments are illustrative of the aspects of the invention. As such, a person skilled in the art may make numerous modifications to the illustrative embodiments described herein, such as token formats and function block/queue memory/switch fabric architectures. Such modifications and other arrangements which may be devised to implement the invention should not be deemed as departing from the spirit and scope of the invention as described and claimed herein.

INDUSTRIAL APPLICABILITY

By the present invention, a user can implement a highly parallel multi-threading processor array that can be employed in a wide variety of applications. Automatic thread synchronisation logic ensures simpler silicon and compilers. The use of heterogeneous function blocks that can be shared by different threads means that the logic circuit resources are optimised for an application. Consequently, this reduces silicon real estate, testing time and overall system costs. As a result, writing program code for parallel processing applications would be easier as the program code is closer to the hardware implementation.

What is claimed is:

1. A hardware array processor that implements multi-threaded processing comprising:
   one or a plurality of thread coordinators; one or a plurality of self-routing switch fabrics; an array of addressable heterogeneous function blocks;
   said self-routing switch fabric or each of said plurality of self-routing switch fabrics comprising: one or a plurality of input ports; one or a plurality of output ports; one or a plurality of queue memory blocks comprising a plurality of thread queues; said one or plurality of queue memory blocks further comprising one or a plurality of queue memories, wherein a queue memory of said one or plurality of queue memory blocks is selectively partitioned to form one or a plurality of independent thread queues among the plurality of thread queues; and an array of multiplexers that route tokens received on a self-routing switch fabric input port to a selected queue memory, data output from a queue memory forming a self-routing switch fabric output; wherein:

an addressable heterogeneous function block of the array of addressable heterogeneous function blocks, comprises at least: one or a plurality of input ports, an output port, an addressable heterogeneous function block input port being connected directly to an output port of a self-routing switch fabric, and the addressable heterogeneous function block output port being connected to a self-routing switch fabric input port; wherein:

said one or plurality of queue memory blocks further comprise: queue maintenance and thread synchronisation logic and a queue control block for the plurality of thread queues;

the queue maintenance and thread synchronisation logic comprises: a thread queue scheduler and a programmable circuit; and wherein:

each of the plurality of thread queues has at least an empty flag output, the empty flag outputs configured into groups of any combination via the programmable circuit to form one or more groups of coupled thread queues; the thread queue scheduler is configured to simultaneously read tokens from selected thread queues and transfer them to a connected addressable heterogeneous function block; and each addressable heterogeneous function block is configured to perform operations upon input data, format resultant data as a token by appending a routing tag to the resultant data, and transfer said token via one or a plurality of the self-routing switch fabrics to a thread coordinator or an addressable heterogeneous function block.

2. The hardware array processor according to claim 1, wherein the one or the plurality of thread coordinators are configured to perform a plurality of operations, the plurality of operations consisting of reading program data from program memory; decoding and transferring said program data to program the hardware array processor; issuing and decoding tokens for the purposes of initiating, maintaining and terminating threads; synchronizing thread join operations, a synchronizing thread join operation being initiated by the reception and decoding of a first thread complete token comprising at least a number of related threads value; storing the number of related threads value contained in said first thread complete token associated with the synchronizing thread join operation; and maintaining related threads count for each subsequent decoding of a related thread complete token and then issuing a thread initiator token once synchronization has been accomplished.

3. The hardware array processor of claim 1, wherein the addressable heterogeneous function blocks contain control circuitry to implement one or a plurality of thread control functions, the plurality of thread control functions consisting of for loops, do-while loops, if-else functions and case statements.

4. The hardware array processor of claim 1, wherein a plurality of addressable heterogeneous function blocks are interconnected via said one or plurality of self-routing switch fabrics to form one of a plurality of hardware array processing architectures, the plurality of hardware array processing architectures consisting of level-1 function blocks, level-2 function blocks, fractal, hierarchical, hypercube, butterfly fat tree, Single Instruction Multiple Data (SIMD) and Multiple Instruction Multiple Data (MIMD) architectures.

5. The hardware array processor of claim 4, wherein the one or plurality of self-routing switch fabrics are selected from a plurality of different types of self-routing switch fabric types, the plurality of different types of self-routing switch fabric types consisting of blocking self-routing switch fabrics and non-blocking self-routing switch fabrics, said one or each of said plurality of self-routing switch fabrics having any combination of output independent thread queues, intermediate independent thread queues and input independent thread queues.

6. The hardware array processor of claim 5, wherein an output buffered thread queue implementation is selected from a plurality of different types of queuing implementations, the plurality of different types of queuing implementations consisting of linked list queues and predefined memory allocation queues, wherein each independent thread queue has a dedicated pair of read and write pointers.

7. The hardware array processor of claim 1, wherein the thread queue scheduler implements a scheduling algorithm, the scheduling algorithm is selected from a plurality of different types of scheduling algorithms, the plurality of different types of scheduling algorithms consisting of priority based scheduling, round robin scheduling, weighted round robin scheduling, scheduling proportional to thread queue level and first-come first-served scheduling.

8. The hardware array processor of claim 7, wherein a thread queue scheduler steals timeslots allocated to other thread queues when a thread queue level reaches or exceeds a programmable predefined level.

9. The hardware array processor of claim 7, wherein the thread queue scheduler is configured to issue flow control tokens when a programmable predefined thread queue level for a thread is exceeded, an issued flow control token being transferred to and decoded by a thread coordinator associated with the thread, the thread coordinator subsequently reducing the rate at which the thread queue scheduler issues thread initiator tokens using a programmable rate reduction circuitry.

10. The hardware array processor of claim 1, wherein an addressable heterogeneous function block comprises a queue maintenance and thread synchronisation logic block, the queue maintenance and thread synchronisation logic block further comprising at least a function block interrupt controller, the acceptance of an interrupt by the function block interrupt controller causing the queue maintenance and thread synchronisation logic block to suspend the reading of tokens from coupled thread queues associated with an interrupt, the reading of non-interrupted coupled thread queues continuing as previously configured or being adjusted by re-allocating suspended coupled thread queue timeslots amongst any remaining non-interrupted thread queues.

11. The hardware array processor according to claim 10, in which a suspended group of thread queues associated with a particular thread can be cleared.

12. The hardware array processor of claim 1, wherein the queue maintenance and thread synchronisation logic further comprises an inter-thread synchronisation register, wherein an inter-thread synchronisation register output is coupled via a programmable circuit to selectively inhibit and activate a group of threads.

13. The hardware array processor of claim 1, wherein a token received by an addressable heterogeneous function block, thread coordinator and switch fabric can be repeatedly multicast M times, where M is an integer greater than or equal to two, to form M multicast tokens, each multicast token having at least a different routing tag.

14. A non-transitory machine-readable medium containing data and instructions, wherein said data is processed by a machine according to said instructions, enabling the machine to generate a representation of the hardware array processor of claim 1.

15. The non-transitory machine-readable medium of claim 14, wherein the data and instructions form part of an Electronic Design Automation (EDA) tool chain for use in a System-on-a Chip (SoC) design process wherein, the Electronic Design Automation (EDA) tool chain is employed to generate a representation of the hardware array processor.

16. A hardware array processor that implements multi-threaded processing comprising:
- one or a plurality of thread coordinators; one or a plurality of self-routing switch fabrics; an array of addressable heterogeneous function blocks;
- said self-routing switch fabric or each of said plurality of self-routing switch fabrics comprising: one or a plurality of input ports, one or a plurality of output ports, and an array of multiplexers that route tokens received on a self-routing switch fabric input port to a selected queue memory, data output from a queue memory forming a self-routing switch fabric output;
- each of said addressable heterogeneous function blocks, comprising at least: one or a plurality of input ports, an output port, one or plurality of queue memory blocks comprising a plurality of thread queues, a queue memory block further comprising at least one or a plurality of queue memories, wherein said queue memory or each of said plurality of queue memories is selectively partitioned to form one or a plurality of independent thread queues among the plurality of thread queues, each addressable heterogeneous function block input port being connected directly to a output port of a self-routing switch fabric, each addressable heterogeneous function block output port being connected to a self-routing switch fabric input port;
- said one or plurality of queue memory blocks further comprising: queue maintenance and thread synchronisation logic and a queue control block for each of the plurality of thread queues;
- each queue maintenance and thread synchronisation logic comprising: a thread queue scheduler and a programmable circuit;
- wherein each of the plurality of thread queues has at least an empty flag output, the empty flag outputs are configured into groups of any combination via a programmable circuit to form one or more groups of coupled thread queues; each thread queue scheduler is configured to simultaneously read tokens from selected thread queues and transfer them to a connected addressable heterogeneous function block; and each addressable heterogeneous function block is configured to perform operations upon input data, format resultant data as a token by at least appending a routing tag to the resultant data and transfer said token via one or a plurality of self-routing switch fabrics to a thread coordinator or an addressable heterogeneous function block.

\* \* \* \* \*